(12) United States Patent
Tokunaka

(10) Patent No.: US 11,731,589 B2
(45) Date of Patent: Aug. 22, 2023

(54) WIPER ARM AND METHOD OF MANUFACTURING SAME

(71) Applicant: MITSUBA Corporation, Gunma (JP)

(72) Inventor: Hiroki Tokunaka, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 17/627,683

(22) PCT Filed: Jul. 15, 2020

(86) PCT No.: PCT/JP2020/027463
§ 371 (c)(1),
(2) Date: Jan. 16, 2022

(87) PCT Pub. No.: WO2021/020123
PCT Pub. Date: Feb. 4, 2021

(65) Prior Publication Data
US 2022/0242373 A1 Aug. 4, 2022

(30) Foreign Application Priority Data

Jul. 31, 2019 (JP) .................................. 2019-140395
Jul. 31, 2019 (JP) .................................. 2019-140396

(51) Int. Cl.
*B60S 1/52* (2006.01)
*B60S 1/34* (2006.01)
*B60S 1/40* (2006.01)

(52) U.S. Cl.
CPC ............... *B60S 1/3429* (2013.01); *B60S 1/34* (2013.01); *B60S 1/4006* (2013.01); *B60S 1/52* (2013.01)

(58) Field of Classification Search
CPC ...... B60S 1/52; B60S 1/34; B60S 1/32; B60S 1/46
See application file for complete search history.

(56) References Cited

U.S. PATENT DOCUMENTS

| | | | |
|---|---|---|---|
| 5,862,567 A * | 1/1999 | Kim .......................... | B60S 1/38 15/250.44 |
| 2016/0016553 A1* | 1/2016 | Schaeuble ............. | B60S 1/4038 15/250.201 |

(Continued)

FOREIGN PATENT DOCUMENTS

EP 3415381 12/2018
JP H05508596 12/1993

(Continued)

OTHER PUBLICATIONS

"International Search Report (Form PCT/ISA/210) of PCT/JP2020/027463," dated Oct. 6, 2020, with English translation thereof, pp. 1-5.

(Continued)

*Primary Examiner* — Michael D Jennings
(74) *Attorney, Agent, or Firm* — JCIPRNET

(57) ABSTRACT

Provided is a wiper arm including: an arm head in which a base end is attached to a swing shaft; an arm shank in which a base end is attached to a tip of the arm head; an arm piece in which a base end is attached to a tip of the arm shank; a washer tube; a washer nozzle attached to a tip of the washer tube; and a cover member covering at least the surrounding of a part of the arm piece and the washer tube in a longitudinal direction. The cover member includes: a first cover body, having a top wall portion, and side wall portions protruding from both sides of the top wall portion in a short-side direction; and a second cover body, attached to the side wall portions and disposed to face the top wall portion.

11 Claims, 13 Drawing Sheets

(56) References Cited

U.S. PATENT DOCUMENTS

2017/0203729 A1* 7/2017 Poton ................... B60S 1/3894
2018/0354463 A1* 12/2018 Jarasson ............... B60S 1/3415

FOREIGN PATENT DOCUMENTS

| JP | H09512510 | 12/1997 |
| JP | 2007015636 | 1/2007 |
| JP | 2008230471 | 10/2008 |
| JP | 2009067142 | 4/2009 |
| JP | 2017013696 | 1/2017 |

OTHER PUBLICATIONS

"Search Report of Europe Counterpart Application", dated Aug. 5, 2022, p. 1-p. 7.

* cited by examiner

WIPER ARM AND METHOD OF MANUFACTURING SAME

CROSS-REFERENCE TO RELATED APPLICATION

This application is a 371 application of the International PCT application serial no. PCT/JP2020/027463, filed on Jul. 15, 2020, which claims the priority benefits of Japan Patent Application No. 2019-140395, filed on Jul. 31, 2019, and Japan Patent Application No. 2019-140396, filed on Jul. 31, 2019. The entirety of each of the above-mentioned patent applications is hereby incorporated by reference herein and made a part of this specification.

TECHNICAL FIELD

The present invention relates to a wiper arm which swings a wiper blade that wipes a surface to be wiped and a method of manufacturing the same.

RELATED ART

A wiper device mounted on a vehicle such as an automobile or the like includes a wiper arm that swings on a surface to be wiped. A wiper blade is attached to a tip of the wiper arm, and a swing shaft arranged on a vehicle body is attached to a base end of the wiper arm. Accordingly, by driving a wiper motor to swing the swing shaft, the wiper blade reciprocates and wipes on the surface to be wiped, and thus the surface to be wiped is wiped clean.

For example, a wiper arm described in Patent literature 1 includes: an arm head which constitutes a part of the wiper arm on the base end side; and a retainer (an arm shank) which constitutes a part of the wiper arm on the tip side. The cross-sectional shape of the retainer along a direction (the short-side direction) intersecting with the longitudinal direction is formed in a substantially U shape, and a hose (washer tube) through which a cleaning liquid flows is routed on the inner side thereof.

A long retainer cover is attached to an opening part of the retainer so as to cover the most part of the retainer. Accordingly, the hose on the inner side of the retainer is covered and hidden. Besides, the cleaning liquid (washer liquid) flowing through the hose is injected from a nozzle arranged at a tip of the retainer toward the surface to be wiped.

CITATION LIST

Patent Literature

Patent Literature 1: Japanese Patent Laid-Open No. 2017-013696

SUMMARY OF INVENTION

Technical Problem

However, in the wiper arm described in Patent literature 1 mentioned above, the retainer occupying the most part of the wiper arm is made of iron, and the cross-sectional surface of the retainer is formed in a substantially U shape. Thus, in addition to increasing the size of the entire wiper arm, there is a problem that the weight of the wiper arm increases. Furthermore, along with the increase in the size of the entire wiper arm, there is a possibility that wiping performance may decrease due to a traveling wind during high-speed traveling, or the design of the wiper arm may decrease.

An objective of the present invention is to provide a wiper arm which can reduce size and weight and improve wiping performance and design, and a method of manufacturing the same.

Solution to Problem

In an aspect of the present invention, a wiper arm swings a wiper blade that wipes a surface to be wiped, and includes: an arm head in which a base end is attached to a swing shaft; an arm shank in which a base end is attached to a tip of the arm head; an arm piece in which a base end is attached to a tip of the arm shank; a washer tube which is disposed along the arm head, the arm shank, and the arm piece; a washer nozzle which is attached to a tip of the washer tube; and a cover member which covers at least the surrounding of a part of the arm piece and the washer tube in the longitudinal direction. The cover member includes: a first cover body which has a top wall portion and a pair of side wall portions protruding from both sides of the top wall portion in the short-side direction; and a second cover body which is attached to the pair of side wall portions and disposed to face the top wall portion.

Effects of Invention

According to the present invention, the wiper arm is configured by the arm head, the arm shank, and the arm piece, and thus the proportion of the arm shank in the longitudinal direction of the wiper arm can be reduced. In other words, because the arm piece is arranged, the arm shank can be shortened. This makes it possible to make the entire wiper arm small and light, as well as improve wiping performance. Additionally, the cover member is attached to a part of the arm piece, and thus the washer tube which is disposed at this part can be hidden. Therefore, the design of the wiper arm can be improved.

Additionally, according to the present invention, the cover member which covers the surrounding of the arm piece and the washer tube is arranged between the arm shank and the washer nozzle, and the washer nozzle and the cover member are concave-convex engaged with each other in the longitudinal direction of the arm piece. Accordingly, the cover member can be arranged so as to eliminate a "step" between the washer nozzle and the arm piece, and the generation of a deviation (step) between the washer nozzle and the cover member can also be prevented. Therefore, even in a wiper arm including a washer nozzle, the wiping performance and design can be improved.

DESCRIPTION OF EMBODIMENTS

Hereinafter, an embodiment of the present invention is described in detail using the drawings.

Figure 1:
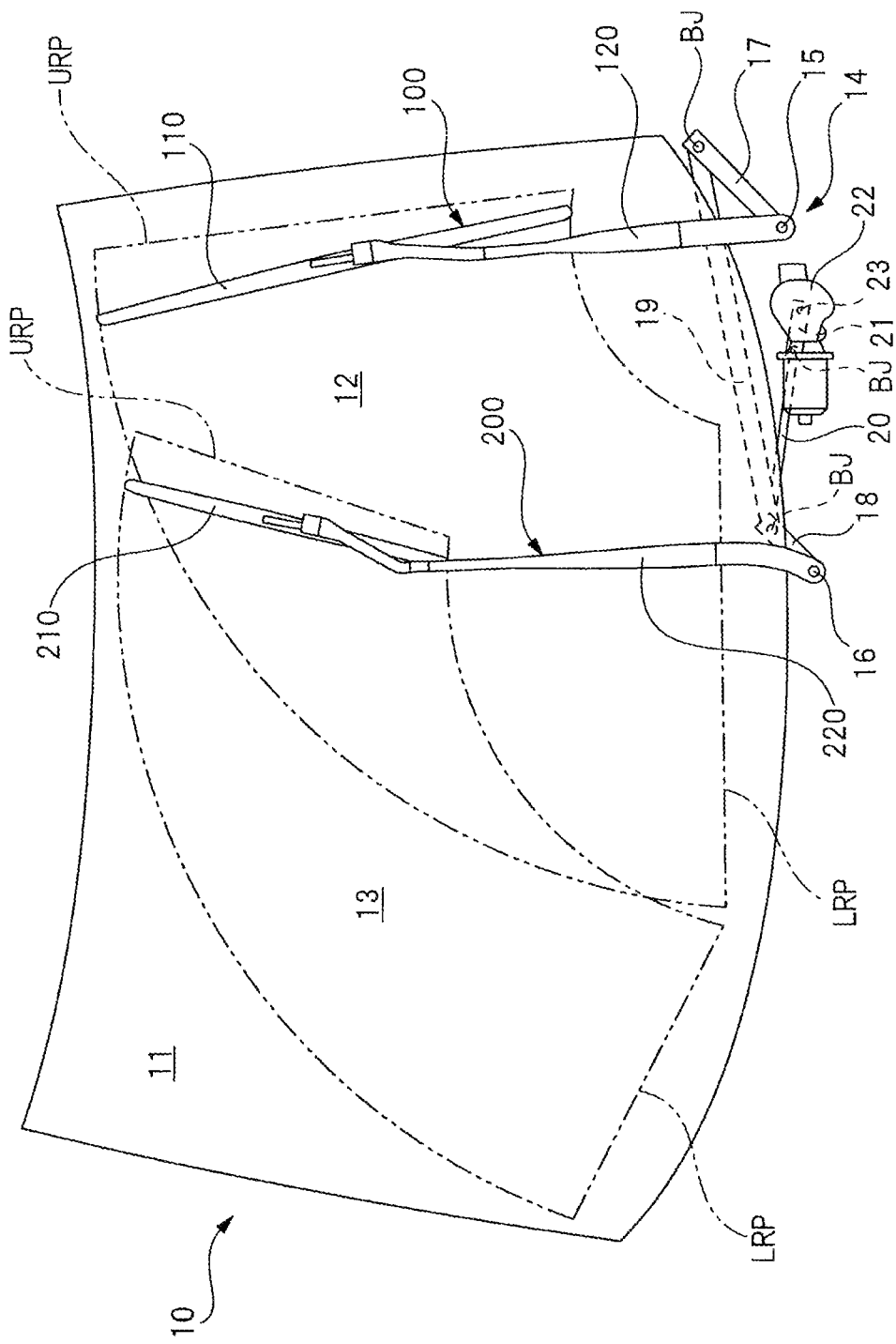
FIG. 1 is a schematic view showing a state in which a wiper device is mounted on a vehicle.
Figure 2:
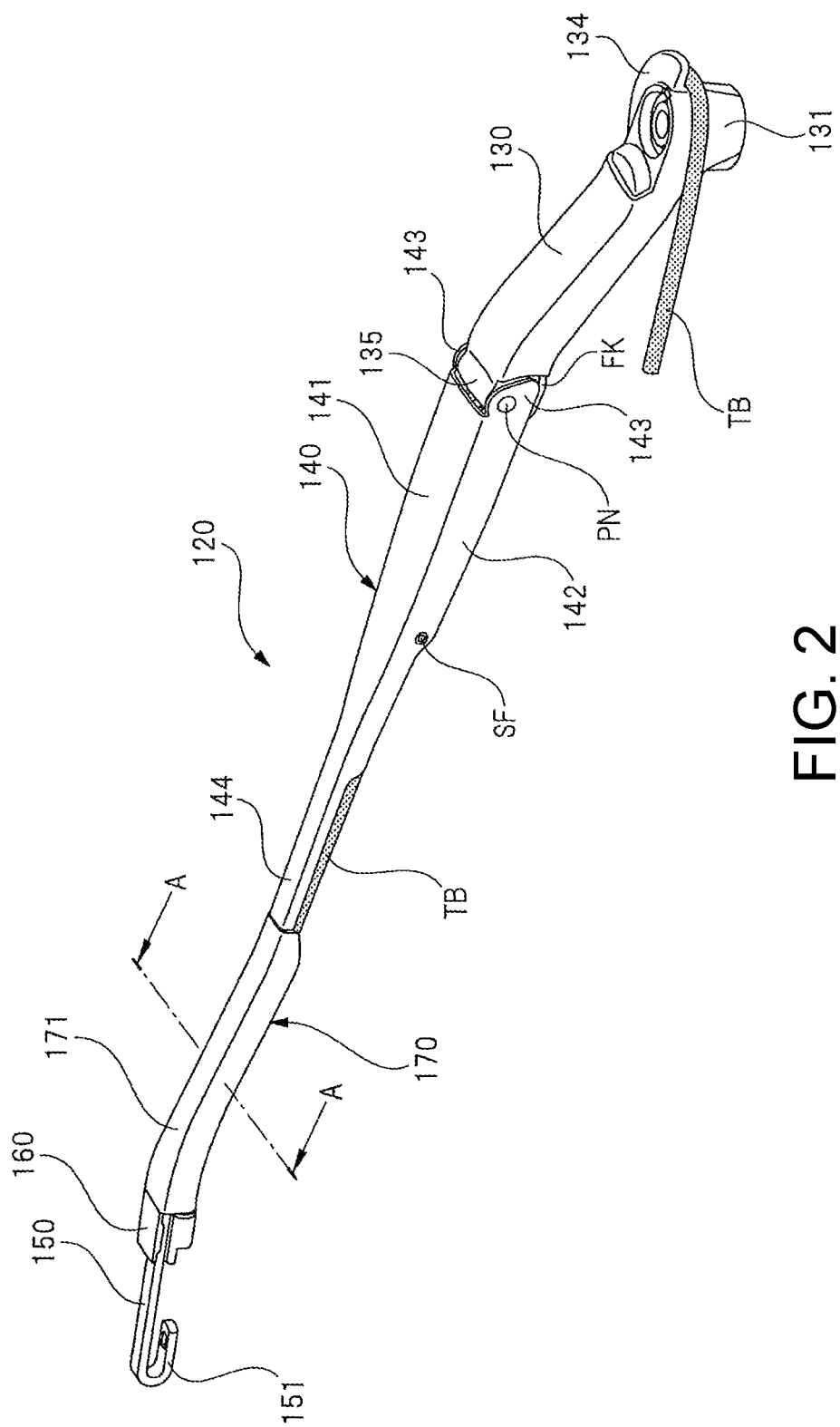
FIG. 2 is a perspective view of a driver-side wiper arm as viewed from the front side.
Figure 3:
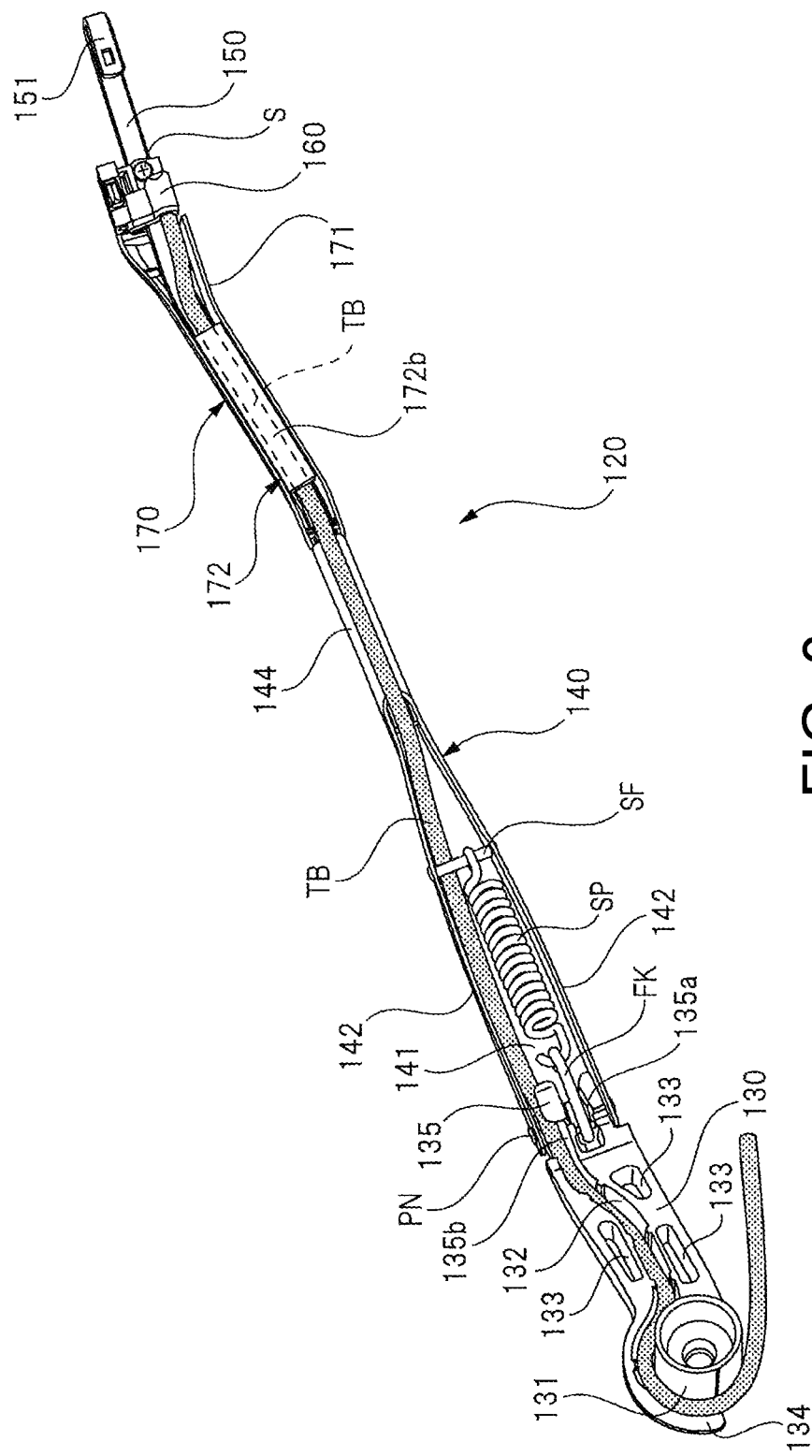
FIG. 3 is a perspective view of the driver-side wiper arm as viewed from the back side.
Figure 4:
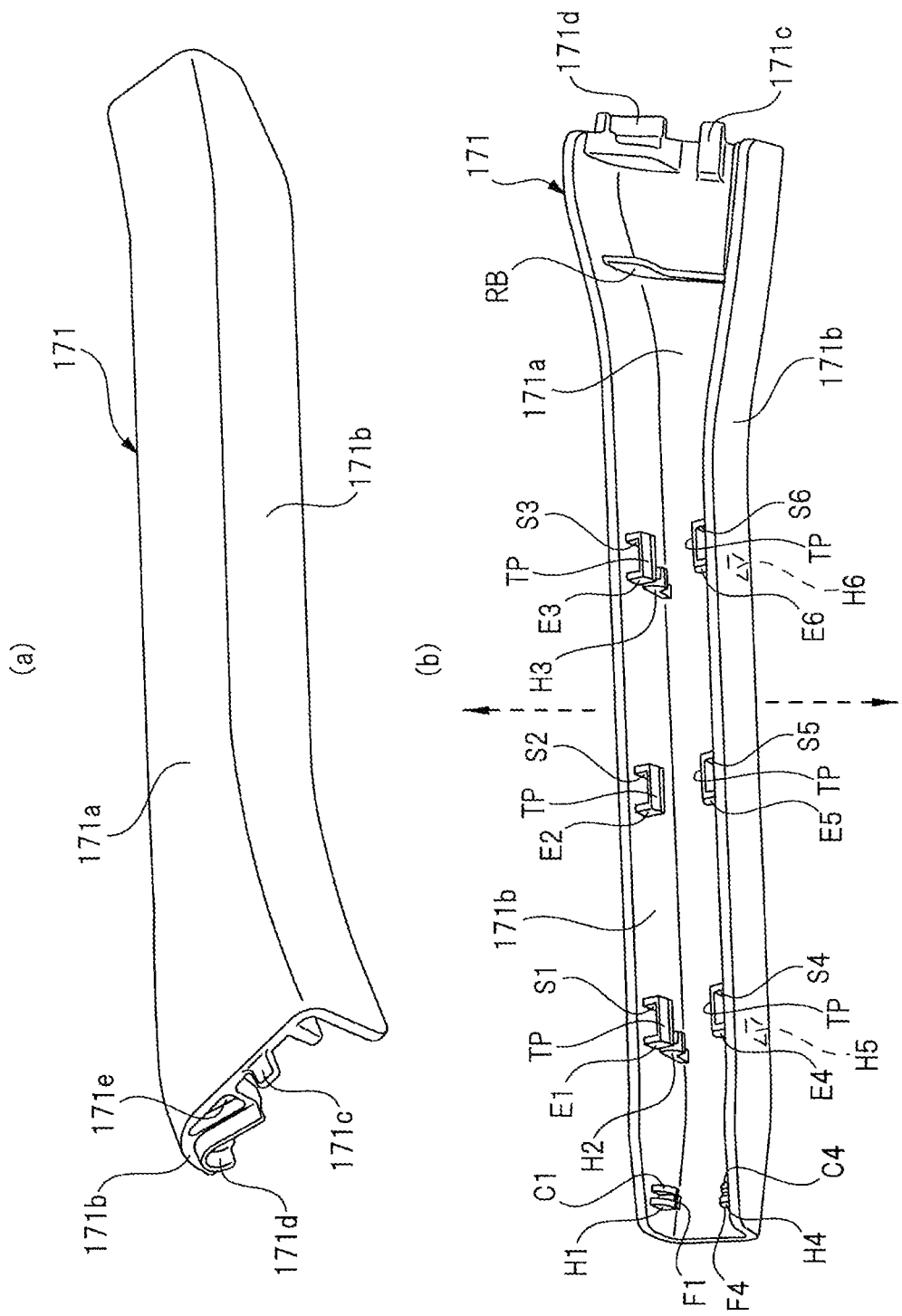
FIG. 4 includes perspective views showing a first cover body.
Figure 5:
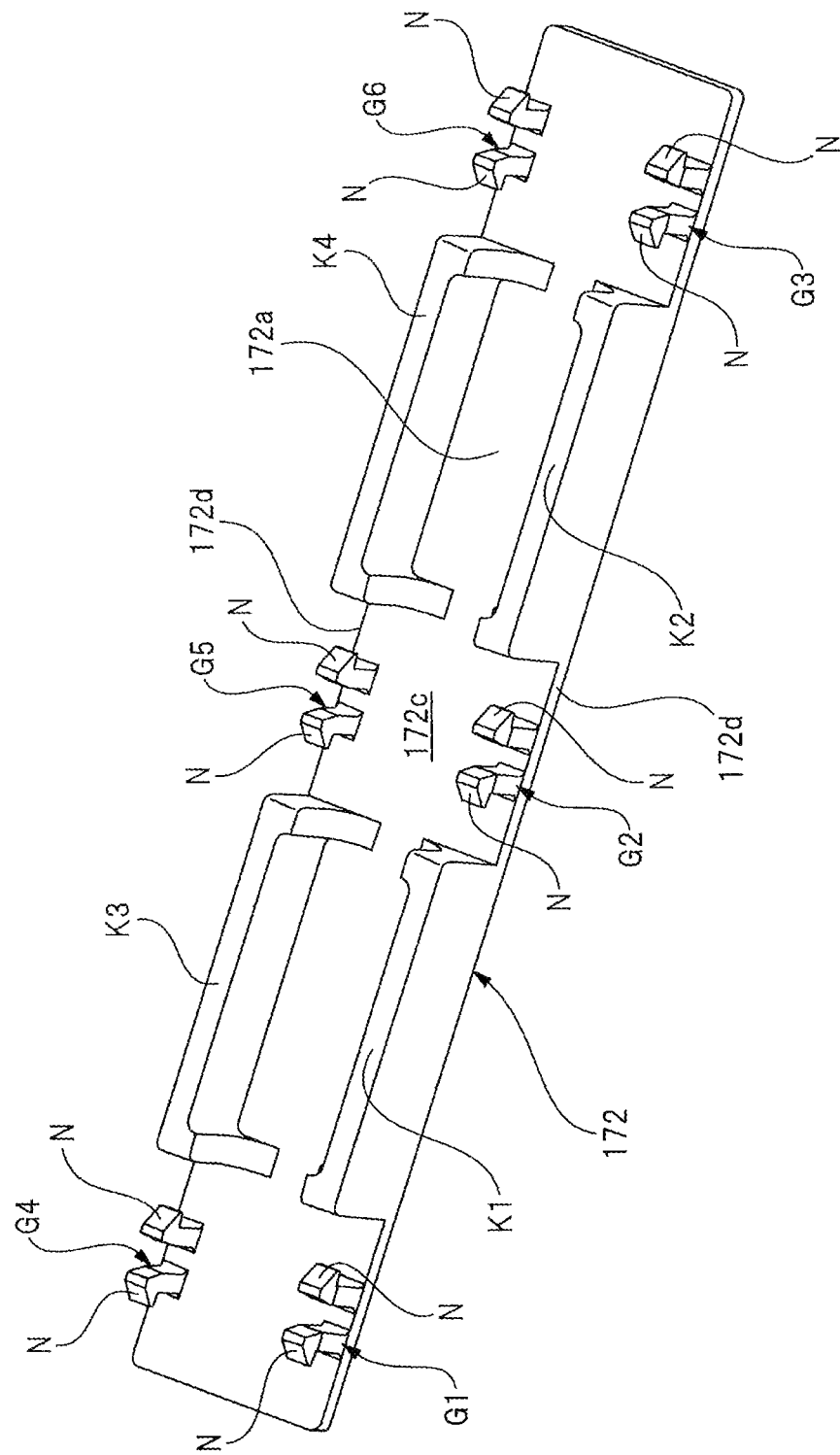
FIG. 5 is a perspective view showing a second cover body.
Figure 6:
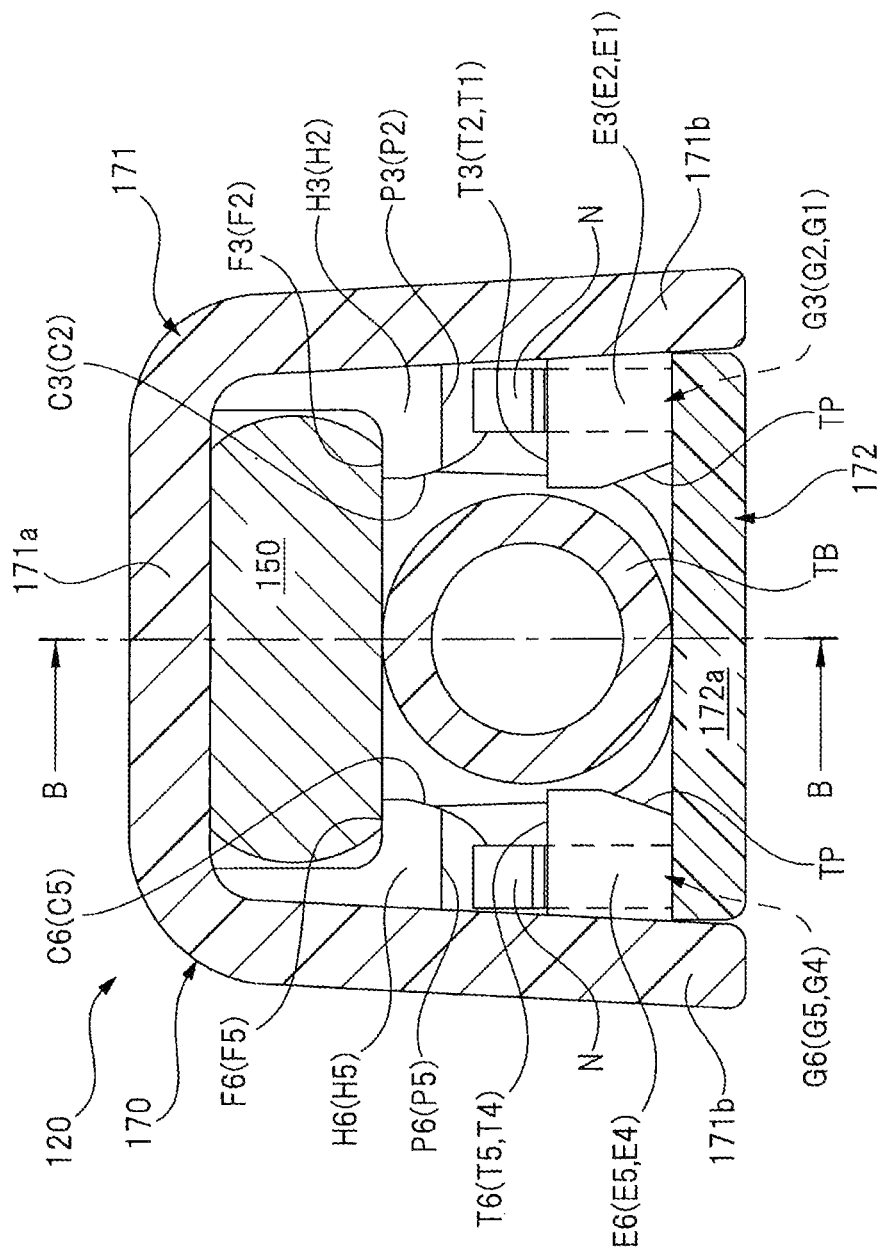
FIG. 6 is a cross-sectional view taken along an A-A line in FIG. 2.
Figure 7:
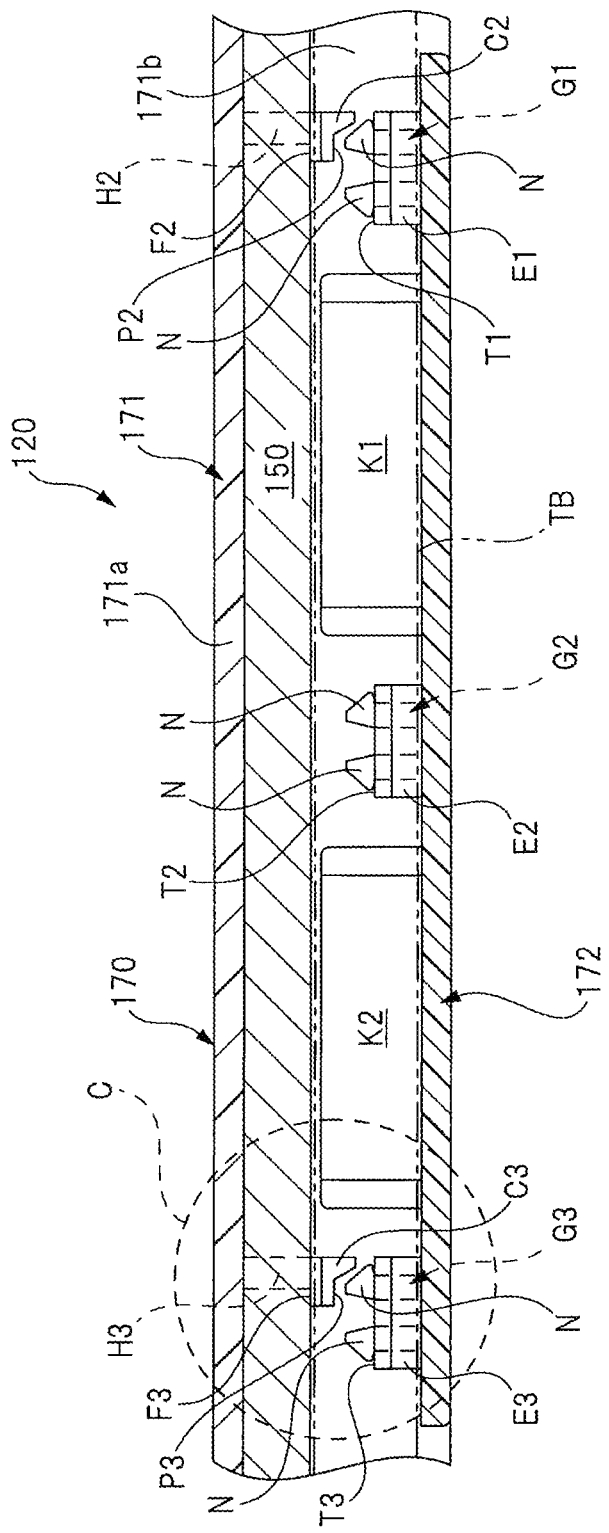
FIG. 7 is a cross-sectional view taken along a B-B line in FIG. 6.
Figure 8:
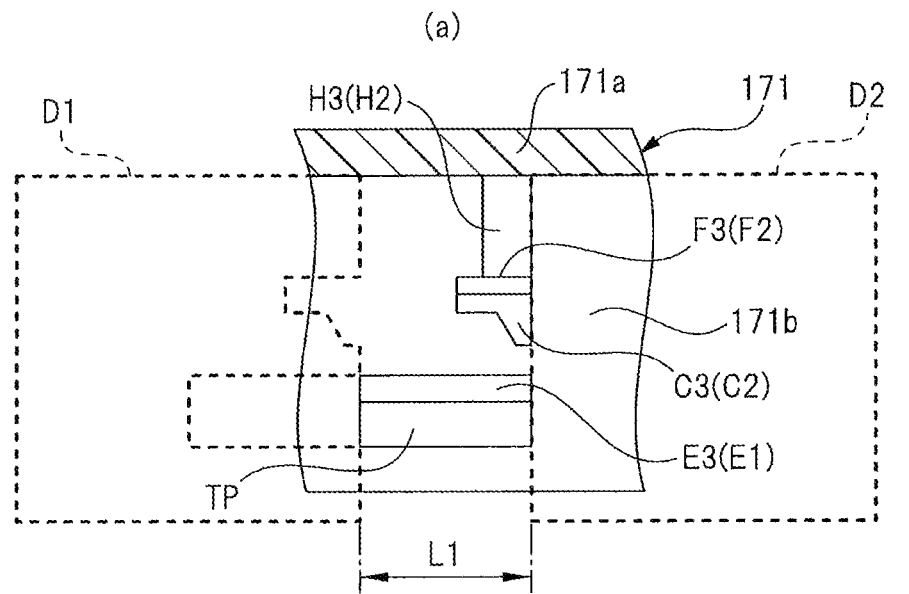
FIG. 8 includes enlarged views corresponding to a dashed circle C part in FIG. 7 showing a mold (present invention and comparative example) for molding the first cover body. (a) of FIG. 8 illustrates the present invention, and (b) of FIG. 8 illustrates a comparative example.
Figure 8:
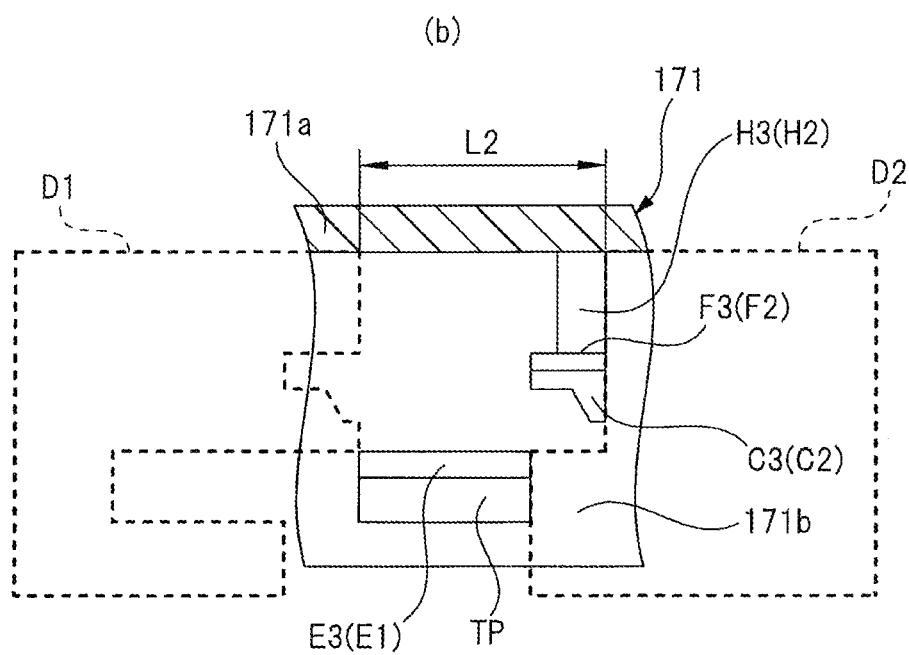
Figure 9:
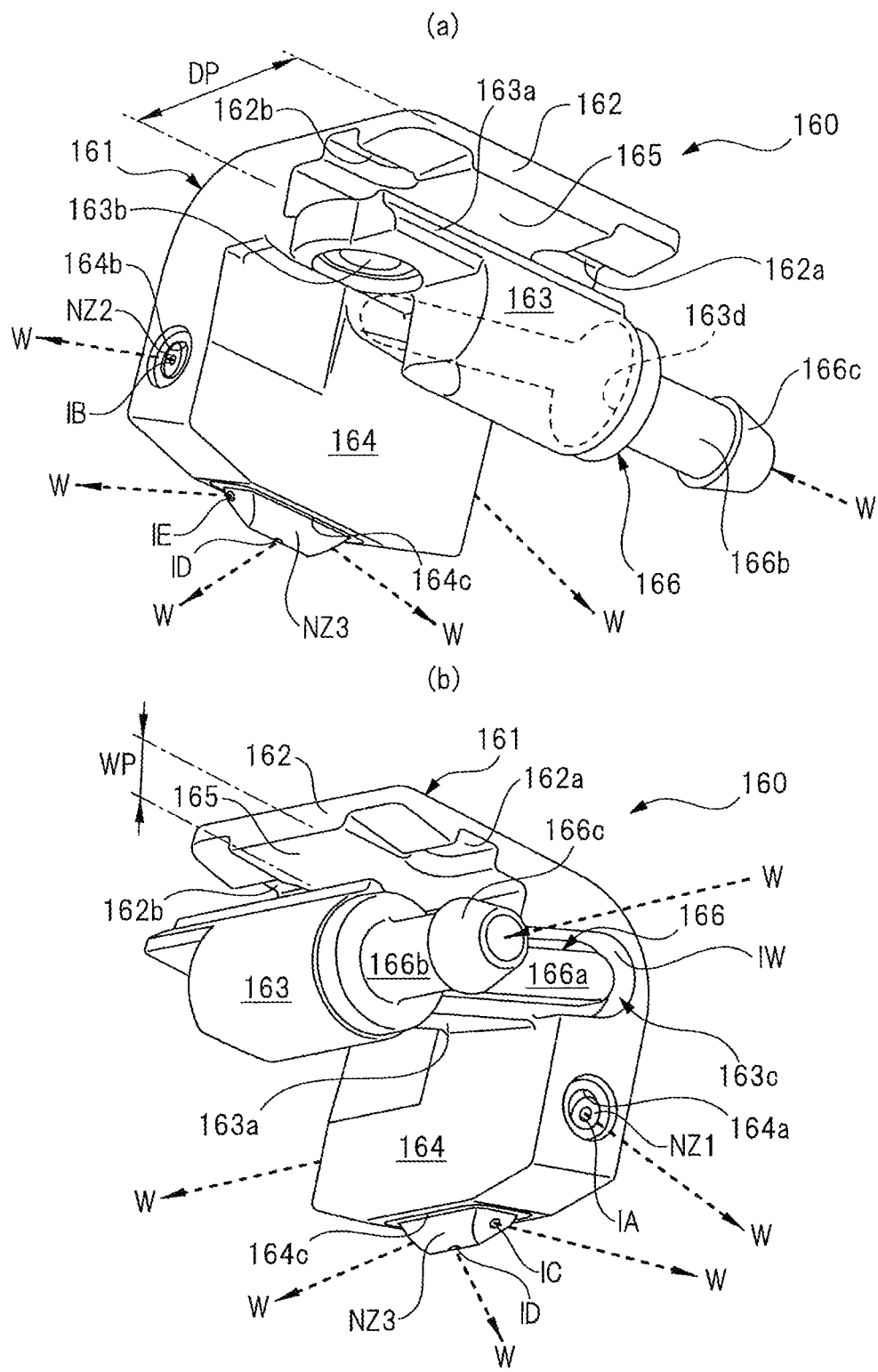
FIG. 9 includes perspective views showing a washer nozzle.

FIG. 1 is a schematic view showing a state in which a wiper device is mounted on a vehicle, FIG. 2 is a perspective view of a driver-side wiper arm as viewed from the front side, FIG. 3 is a perspective view of the driver-side wiper arm as viewed from the back side, FIG. 4 includes perspective views showing a first cover body, FIG. 5 is a perspective view showing a second cover body, FIG. 6 is a cross-sectional view taken along an A-A line in FIG. 2, FIG. 7 is a cross-sectional view taken along a B-B line in FIG. 6, FIG. 8 includes enlarged views corresponding to a dashed circle C part in FIG. 7 showing a mold (present invention and comparative example) for molding the first cover body, and FIG. 9 includes perspective views showing a washer nozzle.

As shown in FIG. 1, a front windshield (surface to be wiped) 11 is arranged on the front side of a vehicle 10 such as an automobile or the like. Additionally, a driver-side (driver seat side) wiper member 100 and an assistant-side (assistant seat side) wiper member 200 which wipe rainwater, dust, and the like adhering to the front windshield 11 are arranged on the front windshield 11.

The driver-side wiper member 100 includes a driver-side wiper blade 110 and a driver-side wiper arm 120, and the driver-side wiper blade 110 is attached to a tip of the driver-side wiper arm 120 in a way of pivoting freely. The assistant-side wiper member 200 includes an assistant-side wiper blade 210 and an assistant-side wiper arm 220, and the assistant-side wiper blade 210 is attached to a tip of the assistant-side wiper arm 220 in a way of pivoting freely.

The driver-side wiper blade 110 and the assistant-side wiper blade 210 respectively reciprocate and wipe a driver-side wiping range 12 and an assistant-side wiping range 13, which are formed between a lower reversal position LRP and an upper reversal position URP on the front windshield 11, in the same direction in synchronization with each other. That is, the wiping pattern of the driver-side wiper blade 110 and the assistant-side wiper blade 210 is a so-called "tandem type".

On a part on the front end side of the front windshield 11 in the vehicle 10, and in the vicinity of a bulkhead (not shown), a wiper device 14 which swings the driver-side wiper member 100 and the assistant-side wiper member 200 is mounted. The wiper device 14 includes a driver-side pivot shaft 15 and an assistant-side pivot shaft 16 as swing shafts, and base ends of the driver-side wiper arm 120 and the assistant-side wiper arm 220 are firmly fixed to tips of the driver-side pivot shaft 15 and the assistant-side pivot shaft 16 by fastening nuts (not shown), respectively.

Additionally, one end of a driver-side drive lever 17 in the longitudinal direction is fixed to a base end of the driver-side pivot shaft 15, and one end of an assistant-side drive lever 18 in the longitudinal direction is fixed to a base end of the assistant-side pivot shaft 16. Additionally, the other ends of the driver-side drive lever 17 and the assistant-side drive lever 18 in the longitudinal direction are respectively joined to both ends of a joining rod 19 in the longitudinal direction in a way of pivoting freely via a ball joint BJ.

One end of a drive rod 20 in the longitudinal direction is further joined to the other end of the assistant-side drive lever 18 in the longitudinal direction in a way of pivoting freely via the ball joint BJ. Additionally, the other end of the drive rod 20 in the longitudinal direction is further joined to one end of a crank arm 21 in the longitudinal direction in a way of pivoting freely via the ball joint BJ.

The other end of the crank arm 21 in the longitudinal direction is fixed to an output shaft 23 of a wiper motor 22, and one end of the crank arm 21 in the longitudinal direction (the part of the crank arm 21 to which the drive rod 20 is joined) rotates along with the rotation of the output shaft 23.

Here, the crank arm 21, the drive rod 20, the joining rod 19, the driver-side drive lever 17, and the assistant-side drive lever 18 constitute a "link mechanism" that convert the rotation motion of the wiper motor 22 into the swing motion of the driver-side pivot shaft 15 and the assistant-side pivot shaft 16. Accordingly, the driver-side pivot shaft 15 and the assistant-side pivot shaft 16 are respectively driven to swing.

Accordingly, the driver-side wiper arm 120 and the assistant-side wiper arm 220 swing, and the driver-side wiper blade 110 and the assistant-side wiper blade 210 respectively wipe the driver-side wiping range 12 and the assistant-side wiping range 13 on the front windshield 11.

Note that, as the wiper motor 22, a brushed electric motor or a brushless electric motor can be used. Herein, when the wiper motor 22 is mounted on a hybrid vehicle (HV), an electric vehicle (EV), or the like in recent years, from the viewpoint of quietness and the like, it is desirable to adopt the brushless electric motor that does not generate sliding contact sound of the brush, and the like (including electromagnetic noise and the like).

As shown in FIGS. 2 and 3, the driver-side wiper arm 120 is formed in a substantially straight linear shape, and an arm head 130, an arm shank 140, and an arm piece 150 are respectively joined and arranged in this order from the base end side of the driver-side wiper arm 120 (the right side in FIG. 2).

The arm head 130 is formed in a substantially rod shape by casting and molding an aluminum material or the like, thereby reducing the weight. At a base end of the arm head 130 in the longitudinal direction, a pivot shaft fixing portion 131 to which the tip of the driver-side pivot shaft 15 (see FIG. 1) is fixed via a fastening nut (not shown) is integrally arranged.

The pivot shaft fixing portion 131 is formed in a substantially tubular shape, and a washer tube TB having flexibility, which is made of silicone rubber or the like, is routed in a way of being wound around the outer peripheral part of the pivot shaft fixing portion 131. Accordingly, when the driver-side wiper arm 120 swings, the washer tube TB is wound around or loosened from the pivot shaft fixing portion 131. Therefore, the washer tube TB is not subjected to a large load.

In other words, the washer tube TB is suppressed from being elastically deformed, and a washer liquid W (see FIG. 9) can smoothly flow inside the washer tube TB. Additionally, because the washer tube TB is suppressed from being elastically deformed, the load applied to the wiper motor 22 is also reduced. Here, in the drawings, the washer tube TB is shaded in order to make it easier to understand the routing state of the washer tube TB.

Additionally, as shown in FIG. 3, on the back side of the arm head 130, in other words, on the front windshield 11 (see FIG. 1) side of the arm head 130, a holding groove 132 which holds the washer tube TB so as to make the washer tube TB not to fall off is arranged. Specifically, the washer tube TB enters the holding groove 132 in a slightly elastically-deformed state. Accordingly, the washer tube TB is reliably held in the holding groove 132 without adversely affecting the flow of the washer liquid W.

Furthermore, on the back side of the arm head 130, a total of three reduced-thickness portions 133 are arranged away from the holding groove 132. These reduced-thickness portions 133 have a function for improving the molding precision of the arm head 130 in addition to a function for making the arm head 130 light.

Additionally, as shown in FIG. 2, on the front side of the arm head 130, in other words, on the side opposite to the front windshield 11 side of the arm head 130, and on a part of the pivot shaft fixing portion 131, a tube guide 134 is integrally arranged in a way of protruding outward in the radial direction of the pivot shaft fixing portion 131. Accordingly, even when the washer tube TB is loosened from the pivot shaft fixing portion 131 when the driver-side wiper arm 120 swings, the washer tube TB does not fall off from the pivot shaft fixing portion 131.

Furthermore, at a tip of the arm head 130 in the longitudinal direction, a shank fixing portion 135 to which a base end of the arm shank 140 in the longitudinal direction is attached is integrally arranged. The arm shank 140 is joined to the shank fixing portion 135 so as to be capable of being locked back, in other words, be capable of rising up with respect to the front windshield 11, and a support pin PN is attached to the shank fixing portion 135. In other words, the arm shank 140 can be locked back centering on the support pin PN.

Additionally, in the shank fixing portion 135, a hooking portion 135a to which a hook member FK made of steel is hooked is arranged. Moreover, one end of a tension spring SP in the longitudinal direction is hooked to the hook member FK. Additionally, the other end of the tension spring SP in the longitudinal direction is hooked to a spring hook SF made of steel, which is fixed to a central part of the arm shank 140 in the longitudinal direction. Besides, a spring force of the tension spring SP acts to press the driver-side wiper blade 110 (see FIG. 1) against the front windshield 11 by a predetermined pressure. On the other hand, the spring force of the tension spring SP also acts to hold the arm shank 140 in a state that the arm shank 140 is made to rise up with respect to the arm head 130 (lock back state).

Furthermore, in the shank fixing portion 135, a lead groove 135b is arranged which is used for leading the washer tube TB held in the holding groove 132 to a predetermined location on the inner side of the arm shank 140. The washer tube TB is attached to the lead groove 135b in a way of not falling off. Besides, the lead groove 135b and the hooking portion 135a are disposed side by side in an axial direction of the support pin PN. Accordingly, as shown in FIG. 3, the tension spring SP and the washer tube TB are disposed side by side in an orderly manner on the inner side of the arm shank 140.

Moreover, in FIG. 3, a central part of the washer tube TB in the longitudinal direction is arranged in a way of diving into the spring hook SF fixed to the arm shank 140. In other words, the central part of the washer tube TB in the longitudinal direction is supported by the spring hook SF, thereby preventing the central part of the washer tube TB in the longitudinal direction from falling off from the inner side of the arm shank 140.

The arm shank 140 is formed to be long by performing press processing or the like on a steel plate. Specifically, the cross-sectional shape of the arm shank 140 along a direction (the short-side direction) intersecting with the longitudinal direction is formed in a substantially U shape. The arm shank 140 includes: a shank top wall 141 disposed on the front side of the driver-side wiper arm 120; and a pair of shank side walls 142 protruding from both sides of the shank top wall 141 in the short-side direction toward the front windshield 11. Accordingly, as shown in FIG. 3, the tension spring SP and the washer tube TB are accommodated on the inner side of the arm shank 140, and when the arm shank 140 is viewed from the lateral side, the tension spring SP and the washer tube TB are hidden by the pair of shank side walls 142.

Additionally, at the base end of the arm shank 140 in the longitudinal direction, a pair of head fixing portions 143 (see FIG. 2) are integrally arranged in a way of protruding in the longitudinal direction of the arm shank 140. These head fixing portions 143 are arranged in a way of sandwiching the shank fixing portion 135 of the arm head 130 from the lateral side, and are joined to the shank fixing portion 135 by the support pin PN. That is, the base end of the arm shank 140 is attached to the tip of the arm head 130.

Furthermore, at a tip of the arm shank 140 in the longitudinal direction, a piece fixing portion 144 to which a base end of the arm piece 150 in the longitudinal direction is fixed is integrally arranged. Specifically, the base end of the arm piece 150 in the longitudinal direction is fixed to the tip of the arm shank 140 in the longitudinal direction by caulking the piece fixing portion 144. Accordingly, the piece fixing portion 144 wraps around the base end of the arm piece 150 in the longitudinal direction. In this way, the base end of the arm piece 150 is attached to the tip of the arm shank 140.

Moreover, the spring hook SF is fixed in the vicinity of the piece fixing portion 144 of the arm shank 140 and between the pair of shank side walls 142. Besides, as shown in FIGS. 2 and 3, the washer tube TB accommodated on the inner side of the arm shank 140 is pulled out to the outside of the arm shank 140 at a part of the piece fixing portion 144. The washer tube TB pulled out to the outside of the arm shank 140 is disposed straight along the piece fixing portion 144 without being loosened. Therefore, the appearance of the driver-side wiper arm 120 is not impaired at this part.

The arm piece 150 is formed in a substantially straight flat-plate shape by performing press processing or the like on a steel plate. Here, the wall thickness of the arm piece 150 is thicker than the wall thickness of the arm shank 140. Accordingly, the size and weight are sufficiently reduced as compared with the conventional structure described above (the structure in which a part of the arm piece is also an arm shank). Moreover, although the wall thickness of the arm piece 150 is thicker than the wall thickness of the arm shank 140, this does not increase the weight of the entire driver-side wiper arm 120 as compared with the conventional structure.

At a tip of the arm piece 150 in the longitudinal direction, a U-shaped hook 151 to which the driver-side wiper blade 110 is attached is integrally arranged. A joining member (not shown) arranged at a central part of the driver-side wiper blade 110 in the longitudinal direction is fixed to the U-shaped hook 151 by a single touch. Moreover, the joining member arranged at the central part of the driver-side wiper blade 110 in the longitudinal direction swings freely with respect to the driver-side wiper blade 110. Therefore, the driver-side wiper blade 110 attached to the arm piece 150 swings freely with respect to the driver-side wiper arm 120.

Additionally, a washer nozzle 160, which injects the washer liquid W (see FIG. 9) toward the front windshield 11, is attached to a part that is close to the U-shaped hook 151 along the longitudinal direction of the arm piece 150. A tip of the washer tube TB in the longitudinal direction is connected to the washer nozzle 160. Here, the washer tube TB routed between the piece fixing portion 144 and the washer nozzle 160 is disposed along the arm piece 150 without being loosened. In this way, the washer tube TB is disposed along the arm head 130, the arm shank 140, and the arm piece 150.

Here, a base end of the washer tube TB in the longitudinal direction is connected to a washer device (not shown) which is installed, for example, inside an engine room of the vehicle 10. The washer device is configured by a washer tank which stores the washer liquid W and a washer pump which is attached to the washer tank. Besides, the washer pump is set in motion by operating a washer switch (not shown) arranged inside the vehicle interior. Accordingly, the washer liquid W inside the washer tank is sent out to the washer tube TB, and then is vigorously injected from the washer nozzle 160 toward the front windshield 11 (see FIG. 9). Note that, the structure of the washer nozzle 160 is described in detail later.

Furthermore, a cover member 170 is attached between the piece fixing portion 144 and the washer nozzle 160 on the arm piece 150 with almost no gap. Accordingly, as shown in FIG. 2, the arm piece 150 between the piece fixing portion 144 and the washer nozzle 160 is prevented from being exposed to the outside, and the appearance of the entire driver-side wiper arm 120 is improved.

Here, the cover member 170 is securely fixed to the arm piece 150 made of steel. Accordingly, the cover member 170 does not rattle against the arm piece 150. Additionally, as shown in FIG. 2, the cover member 170 is arranged so as to eliminate (fill) a step part (step) between the piece fixing portion 144 and the arm piece 150 and a step part (step) between the washer nozzle 160 and the arm piece 150. Accordingly, the front side of the driver-side wiper arm 120 is made to have a smooth (flat) shape, and the design of the driver-side wiper arm 120 is improved. Additionally, because the cover member 170 eliminates the "step", the decrease of wiping performance due to the contact with a traveling wind is effectively suppressed.

Furthermore, as shown in FIG. 3, the cover member 170 covers not only the surrounding of a part of the arm piece 150 in the longitudinal direction but also the surrounding of a part of the washer tube TB in the longitudinal direction. Accordingly, the part of the washer tube TB that is covered by the cover member 170 is prevented from being loosened or exposed to the outside of the cover member 170. Accordingly, the appearance of the entire driver-side wiper arm 120 is also improved.

Next, the structure of the cover member 170 is described in detail using the drawings. As shown in FIGS. 4 and 5, the cover member 170 includes a first cover body 171 and a second cover body 172, and is formed by assembling the first cover body 171 and the second cover body 172.

As shown in FIG. 4, by injection-molding a melted plastic material or the like, the first cover body 171 is formed to have a long length that extends substantially straight along the shape of the arm piece 150. In this way, the first cover body 171 is made of resin, is excellent in design, and achieves weight reduction.

The cross-sectional shape of the first cover body 171 along a direction (the short-side direction) intersecting with the longitudinal direction thereof is formed in a substantially U shape. Specifically, the first cover body 171 includes: a top wall portion 171*a* which is disposed on the front side of the driver-side wiper arm 120 (see FIG. 2); and a pair of side wall portions 171*b* which protrude from both sides of the top wall portion 171*a* in the short-side direction toward the front windshield 11 (see FIG. 1).

Additionally, the width dimension of the first cover body 171 on the tip side in the longitudinal direction (the left side in (a) of FIG. 4 and the right side in of FIG. 4) is greater than the width dimension of the first cover body 171 on the base end side in the longitudinal direction (the right side in (a) of FIG. 4 and the left side in (b) of FIG. 4). This is because, as shown in FIG. 3, the width dimension of the washer nozzle 160 is greater than the width dimension of the piece fixing portion 144.

Besides, as shown in (b) of FIG. 4, on the inner side of the tip side of the widened first cover body 171 in the longitudinal direction, a reinforcing rib RB is arranged in a way of straddling between the pair of side wall portions 171*b* in order to compensate for the decrease in strength of this part. Accordingly, the strength of the wide part of the first cover body 171 is increased to be substantially the same as that of the other parts of the first cover body 171.

Furthermore, a total of six engaged portions E1 to E6 are integrally arranged on the inner side of the first cover body 171 and at a part of the pair of side wall portions 171*b*. The engaged portions E1 to E3 (three) of these engaged portions E1 to E6 are arranged at a part close to a tip of one side wall portion 171*b* described above (a part separated from the top wall portion 171*a*), and are disposed side by side at equal intervals in the longitudinal direction of the first cover body 171. On the other hand, the other engaged portions E4 to E6 (the other three) are arranged at a part close to a tip of the other side wall portion 171*b*, and are disposed side by side at equal intervals in the longitudinal direction of the first cover body 171. Besides, in the width direction of the first cover body 171, the engaged portion E1 and the engaged portion E4 face each other, the engaged portion E2 and the engaged portion E5 face each other, and the engaged portion E3 and the engaged portion E6 face each other.

The engaged portions E1 to E6 are respectively formed in the same shape. Specifically, the engaged portions E1 to E6 protrude at a predetermined height in the short-side direction of the top wall portion 171*a* and extend in the longitudinal direction of the first cover body 171. Additionally, insertion openings S1 to S6, which are opened in the protruding direction of the pair of side wall portions 171*b*, are respectively arranged in the engaged portions E1 to E6. Besides, when the cover member 170 is assembled, a total of six engaging portions G1 to G6 arranged on the second cover body 172 (see FIG. 5) are respectively inserted into these insertion openings S1 to S6. That is, the engaged portions E1 to E6 have a function for fixing the second cover body 172 to the first cover body 171, and by arranging a total of the six engaged portions E1 to E6, the second cover body 172 can be fixed to the first cover body 171 without rattling.

Note that, as shown in FIG. 6, the arm piece 150 and the washer tube TB are inserted inside the first cover body 171, and at that time, there is a possibility that the engaged portions E1 to E6 may get in the way. Therefore, the protruding heights of the engaged portions E1 to E6 with respect to the short-side direction of the top wall portion 171a are minimized according to the rigidity or the like required for the engaged portions E1 to E6. Additionally, tapered surfaces TP are respectively arranged at the engaged portions E1 to E6 on the opening side of the first cover body 171 (the lower side in FIG. 6). Accordingly, it becomes easy to perform the insertion operation of the arm piece 150 and the washer tube TB into the inside of the first cover body 171.

Furthermore, as shown in FIGS. 6 and 7, hooking surfaces T1 to T6 directed to the top wall portion 171a are arranged on the engaged portions E1 to E6. Besides, hooking claws N forming the engaging portions G1 to G6 arranged on the second cover body 172 are hooked to these hooking surfaces T1 to T6. Accordingly, the second cover body 172 can be firmly fixed to the first cover body 171 without rattling.

Additionally, a total of six holding protrusions H1 to H6 are integrally arranged on the inner side of the first cover body 171 and at a part of the pair of side wall portions 171b. The holding protrusions H1 to H3 (three) of these holding protrusions H1 to H6 are arranged at a part close to a base end of one side wall portion 171b (a part close to the top wall portion 171a), and are disposed side by side at predetermined intervals in the longitudinal direction of the first cover body 171. On the other hand, the other holding protrusions H4 to H6 (the other three) are arranged at a part close to a base end of the other side wall portion 171b, and are disposed side by side at predetermined intervals in the longitudinal direction of the first cover body 171. Besides, in the width direction of the first cover body 171, the holding protrusion H1 and the holding protrusion H4 face each other, the holding protrusion H2 and the holding protrusion H5 face each other, and the holding protrusion H3 and the holding protrusion H6 face each other.

As shown in FIG. 6, these holding protrusions H1 to H6 hold the arm piece 150 in a way of embracing the arm piece 150 in a state that the arm piece 150 is abutted against the inner side of the top wall portion 171a. In other words, these holding protrusions H1 to H6 have a function for fixing the first cover body 171 (the cover member 170) to the arm piece 150 in a manner that the first cover body 171 does not rattle against the arm piece 150.

Note that, the two holding protrusions H1 and H4 of the holding protrusions H1 to H6 are respectively formed in the same shape, but are formed in a shape slightly different from that of the other four holding protrusions H2, H3, H5, and H6. The pair of holding protrusions H1 and H4 protrudes at a predetermined height in the short-side direction of the top wall portion 171a, and is disposed close to a base end of the first cover body 171 in the longitudinal direction. Accordingly, the base end of the first cover body 171 in the longitudinal direction is reliably prevented from rattling against the arm piece 150.

The other four holding protrusions H2, H3, H5, and H6 are respectively formed in the same shape, and each of the four holding protrusions H2, H3, H5, and H6 protrudes at a predetermined height in the short-side direction of the top wall portion 171a. Besides, the pair of holding protrusions H2 and H5 of the four holding protrusions H2, H3, H5, and H6 is disposed at the parts corresponding to the pair of engaged portions E1 and E4. Additionally, the pair of holding protrusions H3 and H6 of the four holding protrusions H2, H3, H5 and H6 is disposed at the parts corresponding to the pair of engaged portions E3 and E6.

Specifically, as shown in FIG. 7, the pair of holding protrusions H2 and H5 is respectively disposed at positions that overlap the pair of engaged portions E1 and E4 when the first cover body 171 is viewed from the protruding direction of the pair of side wall portions 171b (the up-down direction in FIG. 7). Additionally, the pair of holding protrusions H3 and H6 is respectively disposed at positions that overlap the pair of engaged portions E3 and E6 when the first cover body 171 is viewed from the protruding direction of the pair of side wall portions 171b. It should be noted that in FIG. 7, only the holding protrusions H2 and H3 and the engaged portions E1 to E3 which are arranged at one side wall portion 171b described above are shown.

Accordingly, as shown in the present invention shown in (a) of FIG. 8, a relative movement distance L1 between a first slide mold D1 and a second slide mold D2 for molding the first cover body 171 can be set to a relatively short distance. Therefore, an increase in the size of the first cover body 171 does not occur, and manufacturing energy for manufacturing the first cover body 171 can be saved. Herein, it is not necessary to make both the first slide mold D1 and the second slide mold D2 capable of sliding freely, and either the first slide mold D1 or the second slide mold D2 may be used as a "fixed mold".

On the other hand, a case is shown in a comparative example shown in (b) of FIG. 8, in which the four holding protrusions H2, H3, H5, and H6 and the four engaged portions E1, E3, E4, and E6 are respectively disposed at positions that do not overlap with each other respectively when the first cover body 171 is viewed from the protruding direction of the pair of side wall portions 171b. In other words, a relative movement distance L2 between the first slide mold D1 and the second slide mold D2 becomes a distance longer than the relative movement distance L1 (L2>L1). Therefore, the size reduction of the first cover body 171 and the saving of the manufacturing energy for manufacturing the first cover body 171 becomes more difficult in the comparative example shown in (b) of FIG. 8 than in the present invention shown in (a) of FIG. 8.

Additionally, support surfaces F1 to F6 which support the arm piece 150 are respectively arranged on a total of the six holding protrusions H1 to H6, and these support surfaces F1 to F6 are directed to the top wall portion 171a. Herein, the support surfaces F1 and F4 of the pair of holding protrusions H1 and H4 are shown in (b) of FIG. 4. Additionally, the support surfaces F2, F3, F5, and F6 of the other four holding protrusions H2, H3, H5, and H6 are shown in FIGS. 6 and 7. Accordingly, the arm piece 150 is sandwiched between the top wall portion 171a and each of the support surfaces F1 to F6 from the plate thickness direction of the arm piece 150. Therefore, the first cover body 171 is firmly fixed to the arm piece 150 without rattling.

Moreover, in order to attach the first cover body 171 to the arm piece 150, there is a need to spread the pair of side wall portions 171b of the first cover body 171 apart from each other as shown by dashed arrows in (b) of FIG. 4. In this case, the tip side of the pair of side wall portions 171b, in other words, the side on which the engaged portions E1 to E6 are disposed, is separated from the top wall portion 171a, and thus it is relatively easy to spread out the pair of side wall portions 171b without damaging the first cover body 171. Thus, the arm piece 150 can be easily disposed on the inner side of the first cover body 171 and at a part of the top wall portion 171a, in other words, at a deepest part (specified position) of the first cover body 171.

Furthermore, arc-shaped surfaces C1 to C6 which guide the attachment of the first cover body 171 to the arm piece 150 are respectively arranged at a total of the six holding protrusions H1 to H6. Herein, the arc-shaped surfaces C1 and C4 of the pair of holding protrusions H1 and H4 are shown in (b) of FIG. 4. Additionally, the arc-shaped surfaces C2, C3, C5, and C6 of the other four holding protrusions H2, H3, H5, and H6 are shown in FIGS. 6 and 7. Accordingly, when the first cover body 171 is attached to the arm piece 150, the arm piece 150 can easily get over each of the holding protrusions H1 to H6. In this way, each of the arc-shaped surfaces C1 to C6 plays a role of improving the assembling property of the first cover body 171 to the arm piece 150.

Furthermore, as shown in FIGS. 6 and 7, recessed portions P2, P3, P5, and P6 are respectively arranged in a part at which the arc-shaped surfaces C2, C3, C5, and C6 of the four holding protrusions H2, H3, H5, and H6 are arranged, the recessed portions P2, P3, P5, and P6 being away from the hooking claws N of the second cover body 172 in a state that the cover member 170 is assembled. Accordingly, the hooking claws N are prevented from interfering with the four holding protrusions H2, H3, H5, and H6, and the assembling property of the cover member 170 is improved. Note that, only the recessed portions P2 and P3 are shown in FIG. 7.

Additionally, as shown in FIG. 4, a first convex portion 171c and a second convex portion 171d are integrally arranged at a tip of the first cover body 171 in the longitudinal direction (the left side in (a) of FIG. 4 and the right side in (b) of FIG. 4). Each of the first convex portion 171c and the second convex portion 171d constitutes an engagement convex portion in the present invention, and the first convex portion 171c and the second convex portion 171d respectively protrude in the same direction. Note that, the second convex portion 171d of the first convex portion 171c and the second convex portion 171d constitutes another engagement convex portion in the present invention. Specifically, the first convex portion 171c and the second convex portion 171d protrude toward the tip side of the arm piece 150 in the longitudinal direction (see FIG. 12).

The first convex portion 171c is disposed at a substantially central part of the top wall portion 171a along the width direction of the first cover body 171 and is formed in a substantially flat-plate shape. On the other hand, the second convex portion 171d is disposed close to one side wall portion 171b described above (the upper side wall portion 171b in FIG. 4) along the width direction of the first cover body 171 and is formed in a substantially J shape. Moreover, as shown in (a) of FIG. 4, a reduced-thickness portion 171e which is recessed in the longitudinal direction of the first cover body 171 is formed in the vicinity of the second convex portion 171d. Accordingly, the wall thickness in the vicinity of the second convex portion 171d is reduced, and the molding precision of the second convex portion 171d is improved.

Besides, the first convex portion 171c enters and is engaged with a first concave portion 162a (see (b) of FIG. 9) arranged in a nozzle body 161 of the washer nozzle 160. Additionally, the second convex portion 171d enters and is engaged with a third concave portion 163c (see (b) of FIG. 9) arranged in the nozzle body 161 of the washer nozzle 160. Accordingly, as shown in FIG. 2, the first cover body 171 (the cover member 170) and the nozzle body 161 (the washer nozzle 160) can be securely joined without a step. Here, because the first cover body 171 and the nozzle body 161 are securely joined to each other by concave-convex engagement, rattling between the two is effectively suppressed even when there is a change over time due to long-term use.

Moreover, a columnar protrusion (positioning protrusion) 152 (see FIGS. 11 and 12) arranged on the arm piece 150 also enters and is engaged with the first concave portion 162a together with the first convex portion 171c. Accordingly, the washer nozzle 160 is positioned at a regular position with respect to the arm piece 150, and the cover member 170 is positioned at a regular position with respect to the washer nozzle 160. Note that, the columnar protrusion 152 is disposed on the bottom side of the first concave portion 162a along the longitudinal direction of the arm piece 150, and the first convex portion 171c is disposed on the opening side of the first concave portion 162a along the longitudinal direction of the arm piece 150 (see FIG. 12).

Additionally, the washer nozzle 160 is firmly fixed to the arm piece 150 by a fixing screw S (see FIG. 3), and the cover member 170 is securely joined to the washer nozzle 160. Accordingly, the cover member 170 is also firmly fixed to the arm piece 150 without rattling.

As shown in FIG. 5, by injection-molding a melted plastic material or the like, the second cover body 172 is formed in a plate shape that extends straight along the shape of the arm piece 150. In this way, similar to the first cover body 171, the second cover body 172 is also made of resin, is excellent in design, and achieves weight reduction.

Moreover, as shown in FIG. 3, the length dimension of the second cover body 172 is set to be substantially half the length dimension of the first cover body 171. Accordingly, the washer tube TB is prevented from being loosened and exposed to the outside of the cover member 170, and the weight of the entire cover member 170 is suppressed from increasing.

The second cover body 172 includes a flat plate main body portion 172a formed in a substantially rectangular shape, and the flat plate main body portion 172a is disposed facing the top wall portion 171a of the first cover body 171. Besides, nothing is formed on a front surface 172b (see FIG. 3) of the flat plate main body portion 172a, and a total of the six engaging portions G1 to G6 are integrally arranged on a back surface 172c of the flat plate main body portion 172a. Additionally, a total of four protruding wall portions K1 to K4 are integrally arranged on the back surface 172c of the flat plate main body portion 172a. Besides, each of the engaging portions G1 to G6 and the protruding wall portions K1 to K4 protrudes from the back surface 172c toward the top wall portion 171a (see FIG. 7) in a state that the cover member 170 is assembled.

Additionally, the engaging portions G1 to G3 (three) of a total of the six engaging portions G1 to G6 are arranged on a part close to one long side portion 172d, and are disposed side by side at equal intervals in the longitudinal direction of the second cover body 172. On the other hand, the other engaging portions G4 to G6 (the other three) are arranged on a part close to the other long side portion 172d, and are disposed side by side at equal intervals in the longitudinal direction of the second cover body 172. Besides, in the width direction of the second cover body 172, the engaging portion G1 and the engaging portion G4 face each other, the engaging portion G2 and the engaging portion G5 face each other, and the engaging portion G3 and the engaging portion G6 face each other.

The engaging portions G1 to G6 are respectively formed in the same shape. Specifically, the engaging portions G1 to G6 respectively have two (a pair of) hooking claws N, and these hooking claws N are disposed in a way of turning their backs to each other in the longitudinal direction of the second cover body 172. In other words, the protruding directions of the two hooking claws N are opposite to each other in the longitudinal direction of the second cover body 172. Besides, as shown in FIGS. 6 and 7, each of the hooking claws N forming the engaging portions G1 to G6 is respectively hooked to the hooking surfaces T1 to T6 forming the engaged portions E1 to E6. In this way, for each one of the engaged portions E1 to E6, two hooking claws N are respectively hooked.

Additionally, the two hooking claws N can be respectively elastically deformed by applying a relatively small external force, and the two hooking claws N are respectively disposed side by side at a predetermined interval in the longitudinal direction of the second cover body 172. Accordingly, when respectively hooked to the hooking surfaces T1 to T6 of the engaged portions E1 to E6 (when the cover member 170 is assembled), the two hooking claws N can be inserted into and pass through the insertion openings S1 to S6 of the engaged portions E1 to E6 (see (b) of FIG. 4).

In this way, the engaging portions G1 to G6 of the second cover body 172 has a function for fixing the second cover body 172 to the first cover body 171 by cooperating with the engaged portions E1 to E6 of the first cover body 171. In other words, the second cover body 172 is attached to the pair of side wall portions 171*b* forming the first cover body 171. Besides, because the first cover body 171 and the second cover body 172 are fixed to each other at six locations, the second cover body 172 can be fixed to the first cover body 171 without rattling, and twist or distortion of a part on the opening side of the first cover body 171 (a part to which the second cover body 172 is attached) can be suppressed. Accordingly, the cover member 170 is also reliably prevented from rattling against the arm piece 150.

Furthermore, as shown in FIG. 6, the flat plate main body portion 172*a* of the second cover body 172 completely enters the inner side of the first cover body 171 in a way of fitting between the pair of side wall portions 171*b* of the first cover body 171. Accordingly, twist or distortion of the cover member 170 is also suppressed more reliably, and in addition, the appearance of the cover member 170 is also improved.

Additionally, as shown in FIG. 5, the protruding wall portions K1 to K4 are respectively formed in the same shape. Specifically, the protruding wall portions K1 to K4 are respectively formed in a substantially rectangular plate shape, and are arranged along a pair of the long side portions 172*d*. Besides, the protruding wall portions K1 and K2 (*two*) of a total of the four protruding wall portions K1 to K4 are arranged corresponding to one long side portion 172*d* described above, the protruding wall portion K1 is disposed between the engaging portion G1 and the engaging portion G2, and the protruding wall portion K2 is disposed between the engaging portion G2 and the engaging portion G3. On the other hand, the other protruding wall portions K3 and K4 (the other two) are arranged corresponding to the other long side portion 172*d*, the protruding wall portion K3 is disposed between the engaging portion G4 and the engaging portion G5, and the protruding wall portion K4 is disposed between the engaging portion G5 and the engaging portion G6. Moreover, in the width direction of the second cover body 172, the protruding wall portion K1 and the protruding wall portion K3 face each other, and the protruding wall portion K2 and the protruding wall portion K4 face each other.

As shown in FIG. 7, these protruding wall portions K1 to K4 are accommodated on the inner side of the first cover body 171 in a state that the cover member 170 is assembled.

Besides, the protruding wall portions K1 to K4 enter the inner side of the pair of side wall portions 171*b* forming the first cover body 171 and come into contact with the pair of side wall portions 171*b*. That is, the protruding wall portions K1 to K4 respectively extend parallel to the pair of side wall portions 171*b*.

Accordingly, the positioning of the second cover body 172 with respect to the first cover body 171 can be reliably performed, and the assembly operation of the cover member 170, in other words, the engagement operation between the engaged portions E1 to E6 and the engaging portions G1 to G6 can be easily performed. Additionally, the protruding wall portions K1 to K4 are formed to have a wall thickness thicker than that of the other parts of the second cover body 172. Therefore, twist or distortion of the cover member 170 can be suppressed more reliably. Thus, an unreasonable load is suppressed from being applied to the engaging portions G1 to G6 which are flexible and elastically deformable. Therefore, the second cover body 172 is reliably prevented from coming off from the first cover body 171.

As shown in FIG. 9, the washer nozzle 160 includes the nozzle body 161. The nozzle body 161 is formed in a predetermined shape by injection-molding a resin material such as plastic or the like. Specifically, the nozzle body 161 includes a first wall portion 162, a second wall portion 163, and a third wall portion 164. Besides, base ends of the first wall portion 162 and the third wall portion 164 are connected to each other in a way of forming a substantially right angle, and a base end of the second wall portion 163 is connected between the first wall portion 162 and the third wall portion 164.

An arm piece attachment groove 165 to which the arm piece 150 is attached is formed between the first wall portion 162 and the second wall portion 163. A depth dimension DP of the arm piece attachment groove 165 is greater than a width dimension WL (see FIG. 10) of the arm piece 150 (DP>WL). On the other hand, a width dimension WP of the arm piece attachment groove 165 is slightly smaller than a thickness dimension TN (see FIG. 10) of the arm piece 150 (WP<TN). Accordingly, the arm piece 150 is firmly fixed to the arm piece attachment groove 165 without projecting out or rattling.

Additionally, the first concave portion 162*a*, with which the first convex portion 171*c* (see FIG. 4) arranged at the first cover body 171 enters to be engaged, is arranged on the second wall portion 163 side of the first wall portion 162 and on the cover member 170 side of the nozzle body 161 (the right side in (b) of FIG. 9). The first concave portion 162*a* is arranged in a state of being recessed in the longitudinal direction of the arm piece 150. Besides, the first convex portion 171*c* of the first cover body 171 is attached to (engaged with) the first concave portion 162*a* without rattling.

Furthermore, on the second wall portion 163 side of the first wall portion 162 and on the U-shaped hook 151 side of the nozzle body 161 (the left side in FIG. 12), a second concave portion 162*b* is arranged which is a "clearance" of the fixing screw S (see FIGS. 3 and 11) for fixing the washer nozzle 160 to the arm piece 150. Accordingly, for example, even when the fixing screw S is overtightened, the fixing screw S does not interfere with the first wall portion 162, and the first wall portion 162 can be prevented from being damaged.

Additionally, a flat plate portion 163*a* formed in a substantially flat-plate shape is integrally arranged at the second wall portion 163, and a screw hole 163*b* is arranged on the U-shaped hook 151 side of the flat plate portion 163*a* (the left side in (a) of FIG. 9). The screw hole 163b penetrates in the plate thickness direction of the flat plate portion 163a, and the fixing screw S (see FIGS. 3 and 11) is inserted into the screw hole 163b. That is, the flat plate portion 163a is fixed to the arm piece 150 by the fixing screw S, and the screw hole 163b of the flat plate portion 163a and the second concave portion 162b of the first wall portion 162 are disposed facing each other. Note that, a procedure for fixing the washer nozzle 160 to the arm piece 150 is described in detail later.

Furthermore, the cover member 170 side of the second wall portion 163 is recessed in the longitudinal direction of the arm piece 150 with respect to the first wall portion 162 and the third wall portion 164, and thereby an inner wall 1W is formed between the first wall portion 162 and the third wall portion 164. Besides, a lid portion 166a of a closing member 166 enters the inner side of the inner wall IW via a predetermined gap.

Here, the third concave portion 163c which is formed in a substantially J shape is formed between the inner wall IW and the lid portion 166a. That is, the lid portion 166a is arranged on the inner side of the third concave portion 163c. Additionally, in other words, the third concave portion 163c is disposed along the surrounding of the lid portion 166a. Besides, the second convex portion 171d (see FIG. 4) of the first cover body 171 enters (is engaged with) the third concave portion 163c substantially with no gap and without rattling.

Note that, each of the first concave portion 162a and the third concave portion 163c constitutes an engagement concave portion in the present invention, and the first concave portion 162a and the third concave portion 163c are respectively arranged in a state of being recessed in the same direction (the longitudinal direction of the arm piece 150). Besides, the third concave portion 163c of the first concave portion 162a and the third concave portion 163c constitutes another engagement concave portion in the present invention. Specifically, the first concave portion 162a and the third concave portion 163c are recessed toward the tip side of the arm piece 150 in the longitudinal direction (the left side in FIG. 12).

As shown in FIG. 9, an upstream opening portion (opening portion) 163d is arranged on the cover member 170 side of the second wall portion 163 (one side of the arm piece 150 in the longitudinal direction). The upstream opening portion 163d is sealed by the closing member 166. Note that, the upstream opening portion 163d constitutes an opening portion in the present invention. Additionally, the closing member 166 is formed in a predetermined shape by injection-molding a resin material such as plastic or the like in the same manner as the nozzle body 16, and is fixed to the nozzle body 161 by an adhesion method such as ultrasonic welding or the like.

As shown in FIG. 9, the closing member 166 includes: the lid portion 166a which is elongated and has a substantially rod shape; and a joint portion 166b which is integrally arranged at the lid portion 166a. The lid portion 166a seals the upstream opening portion 163d in a liquid-tight state, thereby preventing the washer liquid W from leaking to the outside of the nozzle body 161. Besides, the third concave portion 163c is disposed around the lid portion 166a, and the second convex portion 171d enters and is engaged with the third concave portion 163c, thereby disposing the second convex portion 171d around the lid portion 166a.

Additionally, the joint portion 166b is formed in a hollow cylindrical shape and extends in a direction orthogonal to the lid portion 166a. Besides, the tip of the washer tube TB in the longitudinal direction is connected to a tip of the joint portion 166b in the longitudinal direction (the right side in (a) of FIG. 9) (see FIG. 12). Moreover, a retaining convex portion 166c having an annular shape, which functions for retaining the washer tube TB, is integrally arranged at the tip of the joint portion 166b in the longitudinal direction.

As shown in FIG. 9, in a part of the third wall portion 164 that is close to the front windshield 11 (the lower side in the drawing), a pair of a first downstream opening portion 164a and a second downstream opening portion 164b which is opened in the longitudinal direction of the arm piece 150 is arranged. Besides, a first nozzle body NZ1 having a substantially spherical shape is attached to the first downstream opening portion 164a, a first injection hole IA from which the washer liquid W is injected being arranged in the first nozzle body NZ1. Additionally, a second nozzle body NZ2 having a substantially spherical shape is attached to the second downstream opening portion 164b, a second injection hole 1B from which the washer liquid W is injected being arranged in the second nozzle body NZ2.

Additionally, in a part of the third wall portion 164 that is closer to the front windshield 11, one third downstream opening portion 164c which is opened in the short-side direction of the arm piece 150 is arranged. A third nozzle body NZ3, which is formed in a substantially box shape and in which three injection holes, namely a third injection hole IC, a fourth injection hole ID, and a fifth injection hole IE are arranged, is attached to the third downstream opening portion 164c.

Here, the first nozzle body NZ1 and the second nozzle body NZ2 are attached to the third wall portion 164 in a way of pivoting freely. Accordingly, the injection position of the washer liquid W injected from the first injection hole IA and the second injection hole IB with respect to the front windshield 11 can be adjusted. On the other hand, the injection position of the washer liquid W injected from the third injection hole IC, the fourth injection hole ID, and the fifth injection hole IE of the third nozzle body NZ3 cannot be adjusted. Herein, depending on the required specifications, instead of the third nozzle body NZ3, a nozzle body having a substantially spherical shape may be used in which the injection position can be adjusted as in the case of the first nozzle body NZ1 and the second nozzle body NZ2.

By pressing with a relatively great force, the first nozzle body NZ1, the second nozzle body NZ2, and the third nozzle body NZ3 are attached in a way of being fitted into the first downstream opening portion 164a, the second downstream opening portion 164b, and the third downstream opening portion 164c, respectively. Besides, the third nozzle body NZ3 is further fixed to the nozzle body 161 by an adhesion method such as ultrasonic welding or the like in the same manner as the closing member 166.

Accordingly, by operating the washer switch to set the washer pump in motion, as shown by dashed arrows in FIG. 9, the washer liquid W flows through a flow path (not shown) formed inside the washer tube TB and the nozzle body 161, and is respectively injected from a total of five injection holes, namely the first injection hole IA, the second injection hole IB, the third injection hole IC, the fourth injection hole ID, and the fifth injection hole IE.

Next, an assembly method (assembly procedure) of the driver-side wiper arm 120 formed as described above is described in detail using the drawings.

Figure 10:
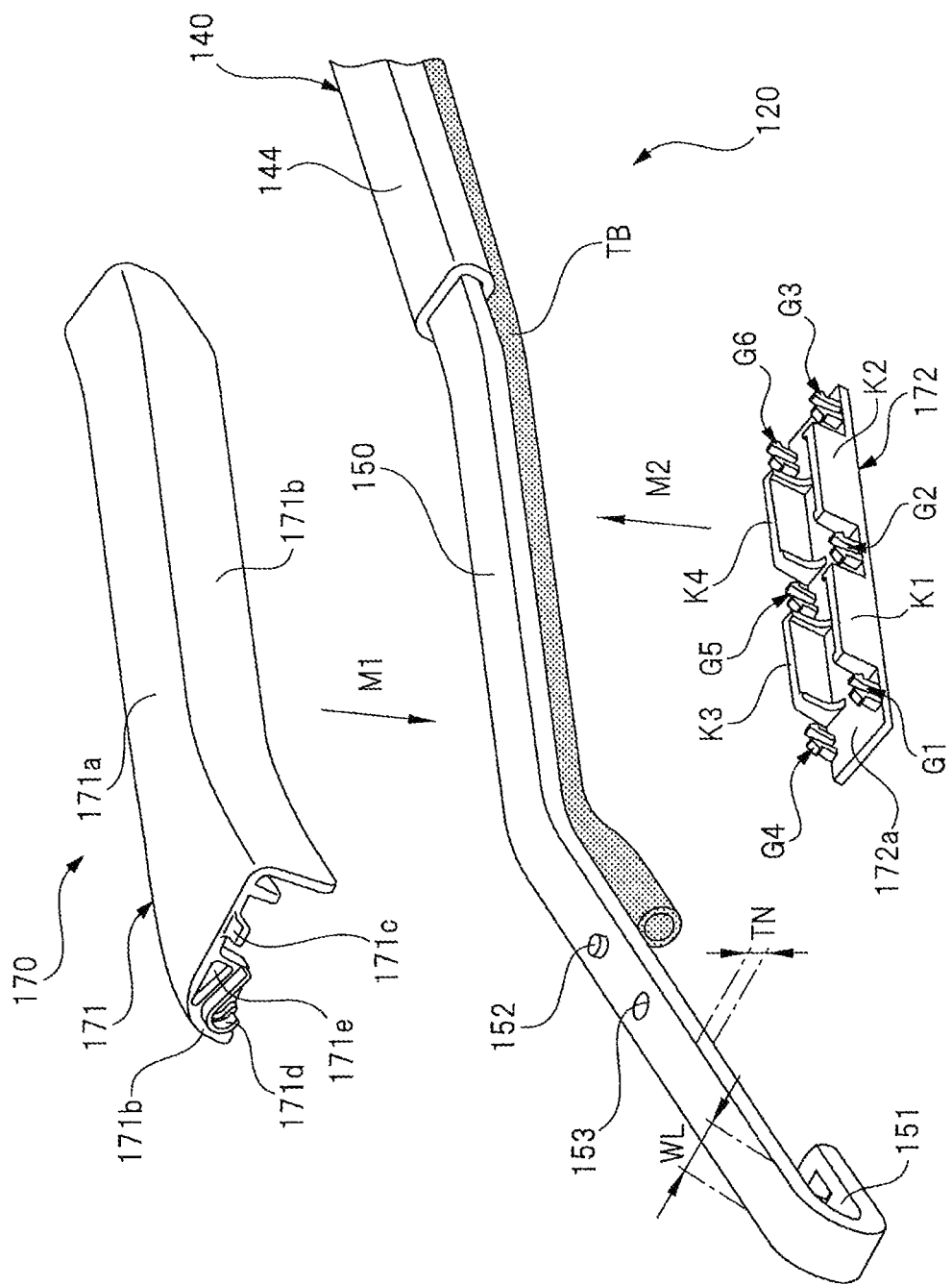
FIG. 10 is a diagram illustrating a procedure for assembling the first cover body and the second cover body to an arm shank.
Figure 11:
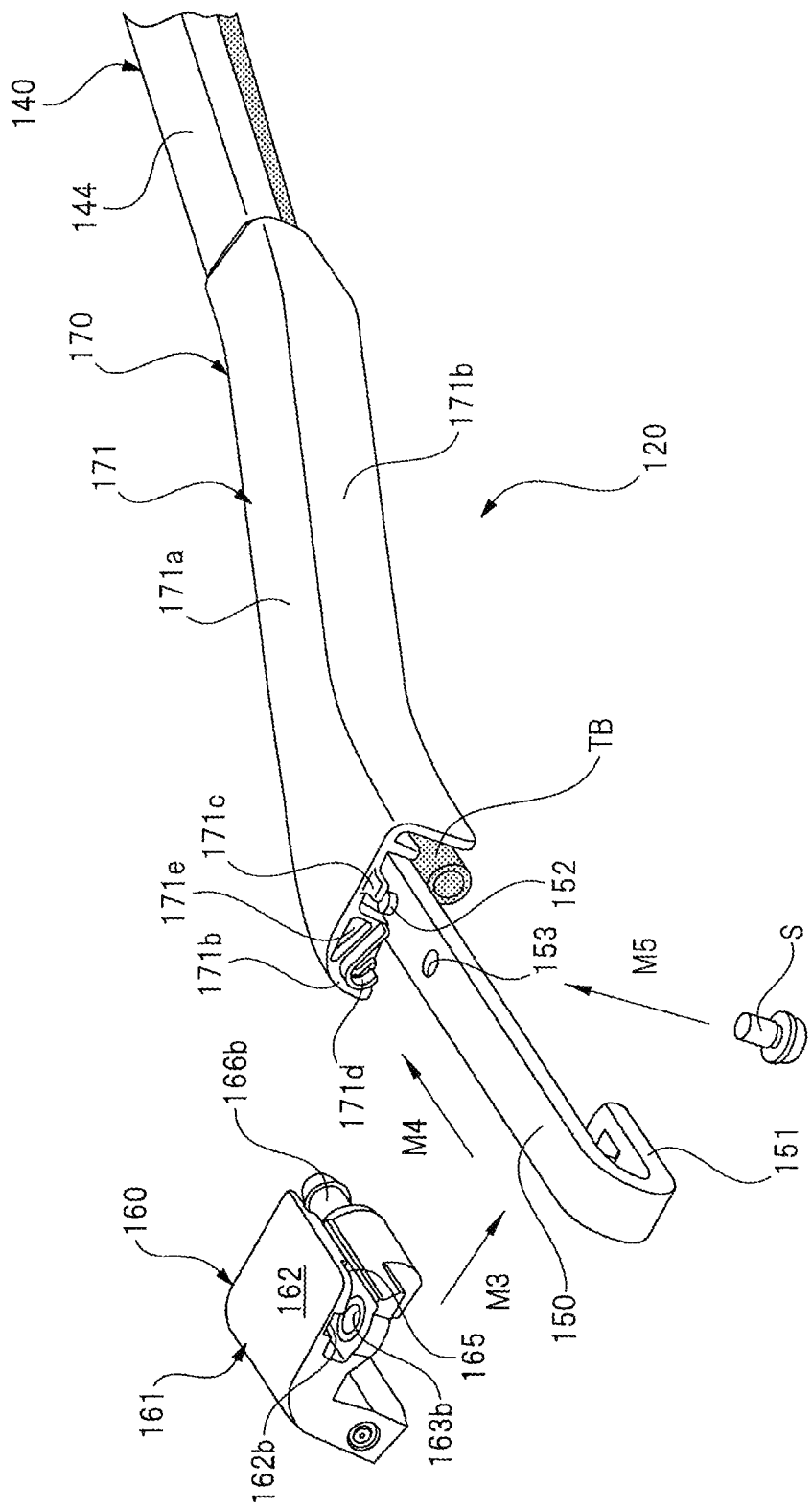
FIG. 11 is a diagram illustrating a procedure for assembling the washer nozzle to the arm shank.
Figure 12:
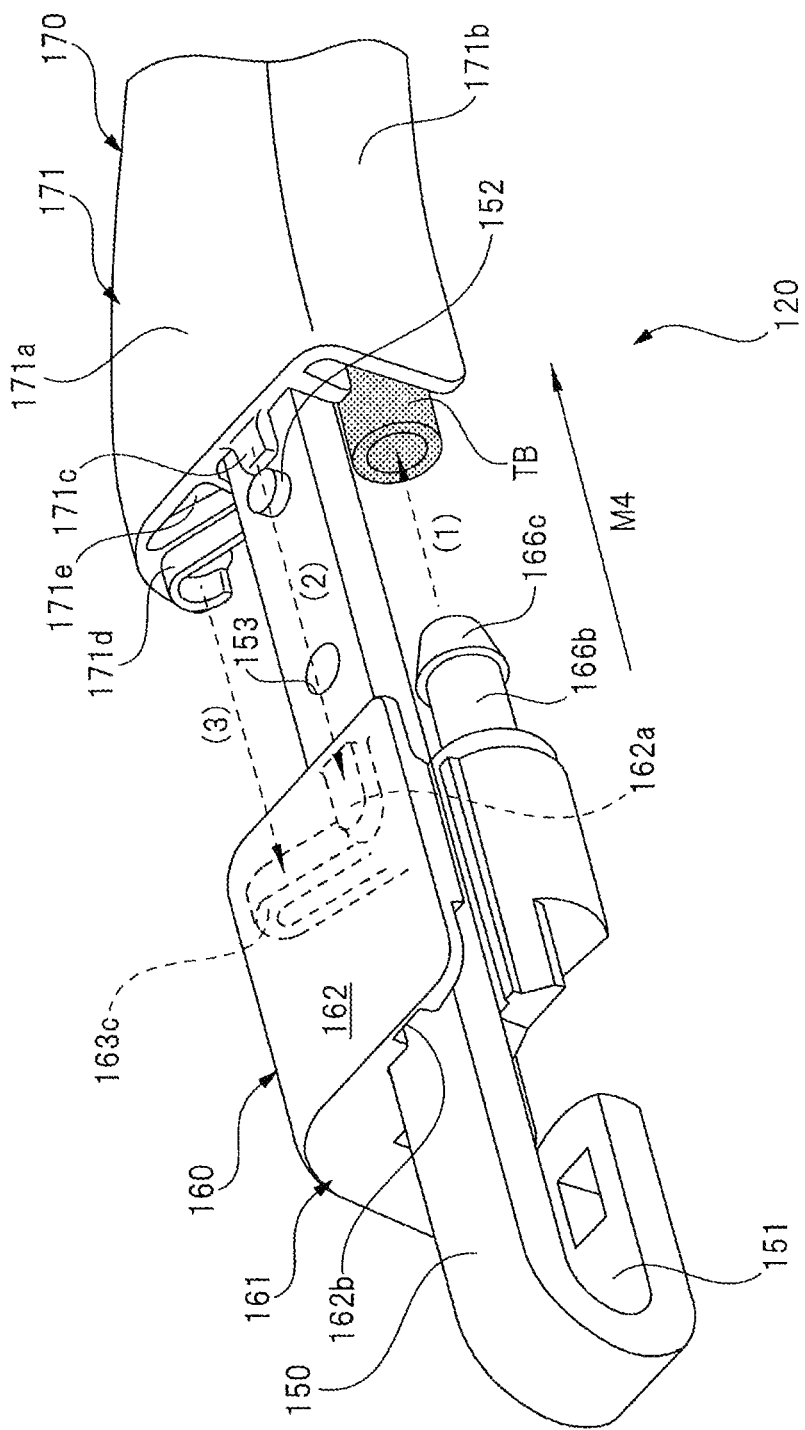
FIG. 12 is a diagram illustrating an assembling procedure of the washer nozzle and the first cover body.

FIG. 10 is a diagram illustrating a procedure for assembling the first cover body and the second cover body to the arm shank, FIG. 11 is a diagram illustrating a procedure for assembling the washer nozzle to the arm shank, and FIG. 12 is a diagram illustrating an assembling procedure of the washer nozzle and the first cover body.

Firstly, the arm head 130 (see FIG. 2), the arm shank 140, and the arm piece 150 are respectively assembled and joined. At this time, the washer tube TB is routed on the inner side of the holding groove 132 of the arm head 130 and the arm shank 140, and the tension spring SP is set on the inner side of the arm shank 140 (see FIG. 3).

[First Process]

As shown in FIG. 10, the first cover body 171 and the second cover body 172 which have been manufactured through another manufacturing process are prepared. Thereafter, as shown by an arrow M1, the first cover body 171 is made to face the arm piece 150 from the thickness direction of the arm piece 150 (the upper direction in the drawing). Next, the pair of side wall portions 171b of the first cover body 171 is spread apart from each other (see the dashed arrows in (b) of FIG. 4). Then, in this state, the top wall portion 171a of the first cover body 171 is pressed by a predetermined pressure in the direction of the arrow M1, and thereby the first cover body 171 is attached to the arm piece 150. At this time, the base end side of the first cover body 171 in the longitudinal direction (the right side in FIG. 10) is abutted against the piece fixing portion 144 of the arm shank 140.

In this way, because the pair of side wall portions 171b is spread apart from each other, the arm piece 150 can easily get over a part of the tapered surfaces TP (see (b) of FIG. 4) of the engaged portions E1 to E6. Furthermore, because the arc-shaped surfaces C1 to C6 (see (b) of FIG. 4, and FIG. 6) are respectively arranged at the holding protrusions H1 to H6, the arm piece 150 can also easily get over the holding protrusions H1 to H6. Therefore, by spreading the pair of side wall portions 171b apart from each other and pressing the top wall portion 171a by a predetermined pressure in the direction of the arrow M1, the arm piece 150 can be easily fixed between the top wall portion 171a and the support surfaces F2, F3, F5, and F6 of the holding protrusions H2, H3, H5, and H6, in other words, at a regular position.

Subsequently, as shown by an arrow M2, the second cover body 172 is made to face the first cover body 171 attached to the arm piece 150. Specifically, the second cover body 172 is made to face the first cover body 171 from the thickness direction of the arm piece 150 (the lower direction in the drawing). At this time, the protruding wall portions K1 to K4 of the second cover body 172 are respectively inserted to the inner side of the pair of side wall portions 171b of the first cover body 171 (see FIG. 6), and the engaging portions G1 to G6 of the second cover body 172 are respectively abutted against the engaged portions E1 to E6 (see (b) of FIG. 4) of the first cover body 171.

Thereafter, the flat plate main body portion 172a of the second cover body 172 is pressed by a predetermined pressure in the direction of the arrow M2, and thereby the second cover body 172 is attached to the first cover body 171. At this time, the hooking claws N (see FIG. 5) of the engaging portions G1 to G6 are securely hooked to the hooking surfaces T1 to T6 (see FIGS. 6 and 7) of the engaged portions E1 to E6, respectively. Accordingly, as shown in FIG. 11, the first cover body 171 and the second cover body 172 are (the cover member 170 is) attached to the arm piece 150 from the short-side direction of the arm piece 150, and the first process is completed.

[Second Process]

Next, the washer nozzle 160 which has been assembled through another assembly process is prepared. Then, as shown by an arrow M3 in FIG. 11, the washer nozzle 160 is made to face the lateral side of the arm piece 150 from the width direction of the arm piece 150 (the left direction in the drawing). At this time, at the part close to the U-shaped hook 151 along the longitudinal direction of the arm piece 150, the opening side of the arm piece attachment groove 165 is made to face the arm piece 150. Accordingly, the arm piece 150 is accommodated inside the arm piece attachment groove 165. Therefore, the washer nozzle 160 is attached to the arm piece 150 from the short-side direction of the arm piece 150, and the second process is completed.

[Third Process]

Next, as shown by arrows M4 in FIGS. 11 and 12, the washer nozzle 160 temporarily attached to the arm piece 150 is slid (moved) in the longitudinal direction of the arm piece 150, and is brought close to the cover member 170 (the first cover body 171). Then, as shown by a dashed arrow (1) in FIG. 12, the tip of the joint portion 166b in the longitudinal direction at the washer nozzle 160 is inserted into the tip of the washer tube TB in the longitudinal direction. Accordingly, the washer nozzle 160 and the washer tube TB are connected, and the washer tube TB is retained by the retaining convex portion 166c.

Thereafter, as shown by the arrows M4, the washer nozzle 160 temporarily attached to the arm piece 150 is further slid in the longitudinal direction of the arm piece 150, and the washer nozzle 160 and the cover member 170 are joined. More specifically, as shown by a dashed arrow (2), the columnar protrusion 152 arranged on the arm piece 150 and the first convex portion 171c arranged at the first cover body 171 are engaged with the first concave portion 162a arranged in the nozzle body 161 in that order. Additionally, at substantially the same time, as shown by a dashed arrow (3), the second convex portion 171d of the first cover body 171 is engaged with the third concave portion 163c arranged in the nozzle body 161.

Accordingly, the washer nozzle 160 is positioned at a regular position with respect to the arm piece 150 by the columnar protrusion 152, the first cover body 171 (the cover member 170) is positioned at a regular position with respect to the arm piece 150 by the concave-convex engagement with the washer nozzle 160, and the third process is completed.

[Fourth Process]

Thereafter, as shown in FIG. 11, the fixing screw S is prepared, and as shown by an arrow M5, the washer nozzle 160 is screwed to the arm piece 150 by the fixing screw S. Here, in the vicinity of the columnar protrusion 152 of the arm piece 150 and on the U-shaped hook 151 side along the longitudinal direction of the arm piece 150, a female screw portion 153 penetrating in the thickness direction of the arm piece 150 is arranged, and the fixing screw S is screw-connected to the female screw portion 153.

Here, in order to screw the washer nozzle 160 to the arm piece 150, firstly, the fixing screw S is inserted into the screw hole 163b of the nozzle body 161. Then, by screw-connecting the fixing screw S to the female screw portion 153, the washer nozzle 160 is firmly fixed to the arm piece 150. At this time, the columnar protrusion 152 of the arm piece 150 is positioned in the depths of the first concave portion 162a (see FIG. 12) of the nozzle body 161, and thus the screw hole 163b of the nozzle body 161 and the female screw portion 153 of the arm piece 150 are in a state that the positions thereof are aligned with each other. Therefore, the screwing operation of the fixing screw S can be easily performed (the assembling property can be improved).

In this way, the assembly operation of the driver-side wiper arm 120 is completed, and the fourth process is finished.

Next, the assistant-side wiper arm 220 (modification) is described in detail using the drawings. Note that, the parts having the same functions as those in the driver-side wiper arm 120 described above are marked with the same signs, and detailed descriptions thereof are omitted.

Figure 13:
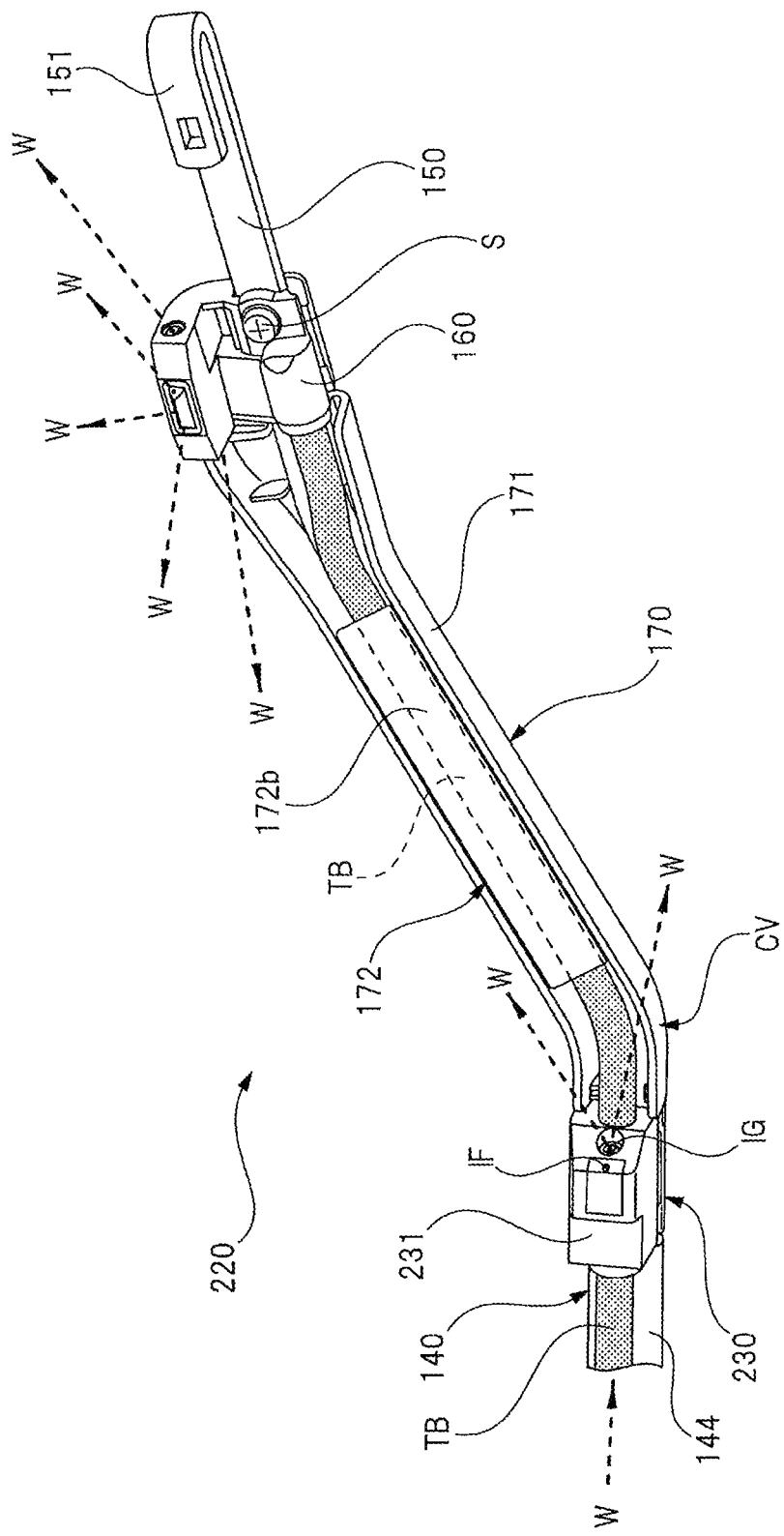
FIG. 13 is a perspective view of a part of a washer nozzle of an assistant-side wiper arm (modification) as viewed from the back side.

FIG. 13 is a perspective view of a part of a washer nozzle of an assistant-side wiper arm (modification) as viewed from the back side.

As shown in FIG. 13, in the assistant-side wiper arm 220, the shape of the arm piece 150 is different from that in the driver-side wiper arm 120 described above due to the difference in layout of the vehicle 10 (see FIG. 1), or the like. Specifically, the arm piece 150 of the driver-side wiper arm 120 extends substantially straight (see FIG. 3), but the arm piece 150 of the assistant-side wiper arm 220 has a greatly curved shape.

Accordingly, a curved portion CV is formed at a part on the base end side of the first cover body 171 in the longitudinal direction (the left side in the drawing), the first cover body 171 constituting the cover member 170 of the assistant-side wiper arm 220. Additionally, a second washer nozzle 230 is arranged in the vicinity of the curved portion CV and in a part on the front windshield 11 side. Specifically, the second washer nozzle 230 is incorporated in the middle of the washer tube TB routed along the assistant-side wiper arm 220.

The second washer nozzle 230 includes a nozzle case 231 formed in a substantially box shape. Besides, the nozzle case 231 is fixed to the arm piece 150, and is disposed in a way of being sandwiched between the base end of the first cover body 171 in the longitudinal direction and the piece fixing portion 144 of the arm shank 140. Accordingly, the nozzle case 231 can be fixed to the arm piece 150 without using a fixing screw or the like.

A sixth injection hole IF and a seventh injection hole IG (two in total) are arranged in the nozzle case 231. Accordingly, as shown by dashed arrows in FIG. 13, the washer liquid W can be injected onto the front windshield 11 and in the vicinity of the curved portion CV. Moreover, inside the nozzle case 231, a main flow path (not shown) having both ends connected to the washer tube TB, and a pair of branch flow paths (not shown) branching from the main flow path and extending toward the sixth injection hole IF and the seventh injection hole IG are arranged.

It should be noted that in a range shown in FIG. 13, the same ones as in the driver-side wiper arm 120 are used as the washer nozzle 160 and the second cover body 172. That is, component parts are standardized between the driver-side and the assistant-side. In this way, in the assistant-side wiper arm 220, the washer liquid W is injected from the injection holes IA, IB, IC, ID, IE, IF, and IG (see FIGS. 9 and 13) in a total of seven locations.

As described in detail above, according to the embodiment, the driver-side wiper arm 120 is configured by the arm head 130, the arm shank 140, and the arm piece 150, and thus the proportion of the arm shank 140 in the longitudinal direction of the driver-side wiper arm 120 can be reduced. In other words, because the arm piece 150 is arranged, the arm shank 140 can be shortened. This makes it possible to make the entire driver-side wiper arm 120 small and light, as well as improve wiping performance. Additionally, the cover member 170 is attached to a part of the arm piece 150, and thus the washer tube TB which is disposed at this part can be hidden. Therefore, the design of the driver-side wiper arm 120 can be improved.

Additionally, according to the embodiment, the first cover body 171 and the second cover body 172 are made of resin; the engaged portions E1 to E6 are arranged at the pair of side wall portions 171b, the engaged portions E1 to E6 protruding in the short-side direction of the top wall portion 171a and having the insertion openings S1 to S6 that are opened in the protruding direction of the pair of side wall portions 171b; and the engaging portions G1 to G6 are arranged on the second cover body 172, the engaging portions G1 to G6 protruding toward the top wall portion 171a and having the hooking claws N that are inserted into the insertion openings S1 to S6 and hooked to the engaged portions E1 to E6.

Accordingly, the design of the cover member 170 can be improved and the weight of the cover member 170 can be reduced. Additionally, the weight-reduced second cover body 172 can be firmly fixed to the weight-reduced first cover body 171 without rattling. Therefore, the noise generated by the driver-side wiper arm 120 can be reduced, and the driver-side wiper arm 120 can be sufficiently applied to a hybrid vehicle, an electric automobile, or the like.

Additionally, according to the embodiment, two above-described hooking claws N are arranged for one of the engaged portions E1 to E6, the two hooking claws N are disposed side by side at a predetermined interval in the longitudinal direction of the second cover body 172, and the two hooking claws N are hooked to the hooking surfaces T1 to T6 of the engaged portions E1 to E6 directed to the top wall portion 171a.

Accordingly, the second cover body 172 can be firmly fixed to the first cover body 171 without rattling, and the second cover body 172 can be prevented from falling off from the first cover body 171 for a long period of time.

Furthermore, according to the embodiment, the holding protrusions H2, H3, H5, and H6 are arranged at the pair of side wall portions 171b, the holding protrusions H2, H3, H5, and H6 protruding in the short-side direction of the top wall portion 171a and being disposed at positions that overlap the engaged portions E1, E3, E4, and E6 when the first cover body 171 is viewed from the protruding direction of the pair of side wall portions 171b; and the arm piece 150 is supported on the support surfaces F2, F3, F5, and F6 of the holding protrusions H2, H3, H5, and H6 directed to the top wall portion 171a.

Accordingly, the arm piece 150 is sandwiched between the top wall portion 171a and each of the support surfaces F2, F3, F5, and F6 from the plate thickness direction of the arm piece 150. Therefore, the first cover body 171 can be firmly fixed to the arm piece 150 without rattling.

Additionally, according to the embodiment, the protruding wall portions K1 to K4 are arranged on the second cover body 172, the protruding wall portions K1 to K4 protruding toward the top wall portion 171a, extending parallel to the pair of side wall portions 171b, and entering the inner side of the pair of side wall portions 171b.

Accordingly, the second cover body 172 can be reliably positioned with respect to the first cover body 171, and the assembly operation of the cover member 170, in other words, the engagement operation between the engaged portions E1 to E6 and the engaging portions G1 to G6 can be easily performed. Additionally, twist or distortion of the cover member 170 can be suppressed more reliably, and thereby an unreasonable load can be suppressed from being applied to the engaging portions G1 to G6 which are flexible and elastically deformable. Therefore, the second cover body 172 can be reliably prevented from coming off from the first cover body 171.

Additionally, according to the embodiment, the cover member 170 which covers the surrounding of the arm piece 150 and the washer tube TB is arranged between the arm shank 140 and the washer nozzle 160, and the washer nozzle 160 and the cover member 170 are concave-convex engaged with each other in the longitudinal direction of the arm piece 150. Accordingly, the cover member 170 can be arranged so as to eliminate a "step" between the washer nozzle 160 and the arm piece 150, and the generation of a deviation (step) between the washer nozzle 160 and the cover member 170 can also be prevented. Therefore, the wiping performance and design can be improved in the driver-side wiper arm 120 including the washer nozzle 160.

Additionally, according to the embodiment, because the washer nozzle 160 is fixed to the arm piece 150 by the fixing screw S, the fixing strength of the washer nozzle 160 to the arm piece 150 can be increased. Therefore, the cover member 170 which is joined to the washer nozzle 160 by concave-convex engagement can also be firmly fixed to the arm piece 150. Furthermore, a dimensional error of the washer nozzle 160 and the cover member 170 can also be absorbed at a concave-convex engaged part between the washer nozzle 160 and the cover member 170.

Furthermore, according to the embodiment, the first concave portion 162a is arranged at the washer nozzle 160; the first convex portion 171c is arranged at the first cover body 171; the columnar protrusion 152 for positioning the washer nozzle 160 is arranged on the arm piece 150; and the first convex portion 171c and the columnar protrusion 152 are engaged with the first concave portion 162a.

Accordingly, both the arm piece 150 and the cover member 170 can be positioned at regular positions with respect to the washer nozzle 160, the joining structure (connection structure) can be simplified, and the assembling property can be improved.

Additionally, according to the embodiment, the third concave portion 163c is arranged at the washer nozzle 160; the second convex portion 171d is arranged at the first cover body 171; the lid portion 166a is arranged on the inner side of the third concave portion 163c, the lid portion 166a closing the upstream opening portion 163d of the nozzle body 161 including a flow path inside; and the second convex portion 171d is disposed around the lid portion 166a.

Accordingly, the second convex portion 171d can be formed in a substantially J shape, and sufficient strength can be ensured for the second convex portion 171d. Therefore, there is no need to increase the thickness dimension of the first cover body 171, an increase in the weight of the cover member 170 can be avoided, and the design of the cover member 170 and even the design of the driver-side wiper arm 120 can be improved.

It goes without saying that the present invention is not limited to the above-described embodiment, and various modifications can be made without departing from the gist thereof. For example, in the above embodiment, it has been shown that the engagement concave portions (162a and 163c) are arranged at the washer nozzle 160, and the engagement convex portions (171c and 171d) are arranged at the first cover body 171, but the present invention is not limited hereto, and for example, the engagement convex portions may also be arranged at the washer nozzle 160, and the engagement concave portions may also be arranged in the first cover body 171.

Additionally, in the above embodiment, it has been shown that the driver-side wiper arm 120 is used for the vehicle 10 such as an automobile or the like, but the present invention is not limited hereto, and for example, the driver-side wiper arm 120 may also be used for an aircraft, a railroad vehicle, a construction machine, or the like.

In addition, as long as the present invention can be achieved, the material, shape, dimension, number, installation location, and the like of each constituent element in the above embodiment are arbitrary and are not limited to the above embodiment.

What is claimed is:

1. A wiper arm, swinging a wiper blade that wipes a surface to be wiped, comprising:
    an arm head in which a base end is attached to a swing shaft;
    an arm shank in which a base end is attached to a tip of the arm head;
    an arm piece in which a base end is attached to a tip of the arm shank;
    a washer tube disposed along the arm head, the arm shank, and the arm piece;
    a washer nozzle attached to a tip of the washer tube; and
    a cover member covering at least the surrounding of a part of the arm piece and the washer tube in a longitudinal direction;
    wherein the cover member comprises:
    a first cover body, having a top wall portion, and a pair of side wall portions protruding from both sides of the top wall portion in a short-side direction of the top wall portion; and
    a second cover body, attached to the pair of side wall portions and disposed to face the top wall portion.

2. The wiper arm according to claim 1, wherein
    the first cover body and the second cover body are made of resin;
    an engaged portion is arranged at the pair of side wall portions, the engaged portion protruding in the short-side direction of the top wall portion and having an insertion opening that opens in a protruding direction of the pair of side wall portions; and
    an engaging portion arranged on the second cover body, the engaging portion protruding toward the top wall portion and having a hooking claw inserted into the insertion opening and hooked to the engaged portion.

3. The wiper arm according to claim 2, wherein
    two hooking claws are arranged for one engaged portion,
    the two hooking claws are disposed side by side at a predetermined interval in the longitudinal direction of the second cover body, and
    the two hooking claws are hooked to a hooking surface of the engaged portion directed to the top wall portion.

4. The wiper arm according to claim 3, wherein
    a holding protrusion is arranged at the pair of side wall portions, the holding protrusion protruding in the short-side direction of the top wall portion and being disposed at a position overlapping the engaged portion when the first cover body is viewed from the protruding direction of the pair of side wall portions; and
    the arm piece is supported on a support surface of the holding protrusion directed to the top wall portion.

5. The wiper arm according to claim 2, wherein
    a holding protrusion is arranged at the pair of side wall portions, the holding protrusion protruding in the short-side direction of the top wall portion and being disposed at a position overlapping the engaged portion when the first cover body is viewed from the protruding direction of the pair of side wall portions; and the arm piece is supported on a support surface of the holding protrusion directed to the top wall portion.

6. The wiper arm according to claim 1, wherein a protruding wall portion is arranged on the second cover body, the protruding wall portion protruding toward the top wall portion, extending parallel to the pair of side wall portions, and entering an inner side of the pair of side wall portions.

7. The wiper arm according to claim 1, further comprising:

an engagement convex portion, arranged at one of the washer nozzle and the cover member and protruding in the longitudinal direction of the arm piece; and an engagement concave portion, arranged at the other of the washer nozzle and the cover member and recessed in the longitudinal direction of the arm piece, with which the engagement convex portion is engaged;

wherein the washer nozzle is fixed to the arm piece, and the cover member is arranged between the arm shank and the washer nozzle.

8. The wiper aim according to claim 7, wherein the washer nozzle is fixed to the arm piece by a fixing screw.

9. The wiper aim according to claim 7, wherein the engagement concave portion is arranged at the washer nozzle, the engagement convex portion is arranged at the cover member, a positioning protrusion for positioning the washer nozzle is arranged on the arm piece, and the engagement convex portion and the positioning protrusion are engaged with the engagement concave portion.

10. The wiper arm according to claim 9, wherein another engagement concave portion is arranged at the washer nozzle;

another engagement convex portion is arranged at the cover member;

a closing member closing an opening portion of the washer nozzle comprising a flow path inside is arranged on an inner side of the another engagement concave portion; and the another engagement convex portion is disposed around the closing member.

11. A method of manufacturing a wiper arm, the wiper arm comprising:

an arm head in which a base end is attached to a swing shaft;

an arm shank in which a base end is attached to a tip of the arm head;

an arm piece in which a base end is attached to a tip of the arm shank;

a washer tube disposed along the arm head, the arm shank, and the arm piece;

a washer nozzle fixed to the arm piece, to which a tip of the washer tube is connected;

a cover member arranged between the arm shank and the washer nozzle, covering at least the surrounding of a part of the arm piece and the washer tube in a longitudinal direction;

an engagement convex portion arranged at one of the washer nozzle and the cover member and protruding in the longitudinal direction of the arm piece; and an engagement concave portion arranged at the other of the washer nozzle and the cover member and recessed in the longitudinal direction of the arm piece, with which the engagement convex portion is engaged;

wherein the cover member comprises:

a first cover body, having a top wall portion, and a pair of side wall portions protruding from both sides of the top wall portion in a short-side direction of the top wall portion; and a second cover body, attached to the pair of side wall portions and disposed to face the top wall portion; and wherein the method of manufacturing a wiper arm comprises:

a first process in which the cover member is attached to the arm piece from a short-side direction of the arm piece;

a second process in which the washer nozzle is attached to the arm piece from the short-side direction of the arm piece;

a third process in which the washer nozzle is moved in the longitudinal direction of the arm piece, and the engagement convex portion and the engagement concave portion are engaged with each other; and a fourth process in which the washer nozzle is fixed to the arm piece by a fixing screw.

\* \* \* \* \*